(12) United States Patent
Hosur et al.

(10) Patent No.: US 7,218,604 B2
(45) Date of Patent: May 15, 2007

(54) ORTHOGONAL FREQUENCY DIVISION MULTIPLEXING SYSTEM WITH DIFFERING CONTROL PARAMETERS CORRESPONDING TO DIFFERENT DATA POINTS IN A SINGLE SYMBOL

(75) Inventors: Srinath Hosur, Plano, TX (US); Dennis Rauschmayer, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1138 days.

(21) Appl. No.: 10/060,502

(22) Filed: Jan. 30, 2002

(65) Prior Publication Data

US 2003/0152023 A1    Aug. 14, 2003

(51) Int. Cl.
*H04J 11/00*  (2006.01)
(52) U.S. Cl. .................. 370/203; 370/350; 370/522
(58) Field of Classification Search ................ 370/203, 370/204, 208, 342, 350, 522, 503
See application file for complete search history.

(56) References Cited

U.S. PATENT DOCUMENTS

| | | | |
|---|---|---|---|
| 6,172,993 B1 * | 1/2001 | Kim et al. .................. 370/516 |
| 6,389,087 B1 * | 5/2002 | Heinonen et al. ........... 375/354 |
| 6,487,252 B1 * | 11/2002 | Kleider et al. .............. 375/260 |
| 2003/0156534 A1 * | 8/2003 | Coulson et al. ............. 370/210 |
| 2005/0207334 A1 * | 9/2005 | Hadad ........................ 370/203 |

\* cited by examiner

*Primary Examiner*—Min Jung
(74) *Attorney, Agent, or Firm*—Steven A. Shaw; W. James Brady; Frederick J. Telecky, Jr.

(57) ABSTRACT

A wireless transmitter ($TX_1$). The transmitter comprises circuitry for providing a plurality of control (CONTROL) bits and circuitry for providing a plurality of user (USER) bits. The transmitter also comprises circuitry for modulating (16) the plurality of control bits and the plurality of user bits into a stream of complex symbols and circuitry (18) for converting the stream of complex symbols into a parallel plurality of complex symbol streams. The transmitter also comprises circuitry (20) for performing an inverse fast Fourier transform on the parallel plurality of complex symbol streams to form a parallel plurality of OFDM symbols and circuitry (22) for converting the parallel plurality of OFDM symbols into a serial stream of OFDM symbols. Each OFDM symbol in the serial stream of OFDM symbols comprises a plurality of data points, and selected ($SF_{2.x}$) OFDM symbols in the serial stream of OFDM symbols carry modulation information (AMOD). The modulation information in one or more of the selected OFDM symbols comprises a plurality of modulation groups, and the plurality of modulation groups comprises a number of modulation parameters that describe modulation of a corresponding set of data points in a subsequent OFDM symbol in the serial stream of OFDM symbols.

33 Claims, 6 Drawing Sheets

ORTHOGONAL FREQUENCY DIVISION MULTIPLEXING SYSTEM WITH DIFFERING CONTROL PARAMETERS CORRESPONDING TO DIFFERENT DATA POINTS IN A SINGLE SYMBOL

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to wireless communications systems and are more particularly directed to an orthogonal frequency division multiplexing ("OFDM") system.

Wireless communications are now prevalent in many applications, including both business and personal communication systems. The present embodiments have particular application in such systems and particularly those that are sometimes referred to as fixed wireless systems. Fixed wireless systems are so named because the last distance of the downliik communication, typically on the order of one or two miles, is expected to include a wireless communication to a device that is not mobile or, if mobile, has a very slow fading characteristic. For example, a fixed wireless system in contemporary applications may include wireless communications to a modem inside a home or business.

One wireless technique that has had favorable use in a fixed environment is OFDM, which also is introduced here as it has particular application to the preferred embodiments described later. By way of introduction to OFDM, the more general frequency division multiplexing ("FDM") is characterized by transmission of multiple signals simultaneously over a single transmission path, such as a wireless system. Each of the multiple signals travels at a different frequency band, sometimes referred to as a carrier or sub-carrier, and which is modulated by the data. More particularly, each sub-carrier is actually a sinc ($\sin(x)/x$) function. In any event, the data carried by each sub-carrier may be user data of many forms, including text, voice, video, and the like. In addition, the data includes control data, a particular type of which is discussed below. In any event, OFDM was developed several years ago, and it adds an element of orthogonality to FDM. In OFDM, the center frequency of each of the sub-carriers are spaced apart at specific frequencies, where the frequency spacing is such that each sub-carrier is orthogonal to the other sub-carriers. As a result of the orthogonality, ideally each receiving element tuned to a given sub-carrier does not perceive any of the signals communicated at any other of the sub-carriers. Given this aspect, various benefits arise. For example, OFDM is able to use overlapping (while orthogonal) sub-carriers and, as a result, thorough use is made of the overall OFDM spectrum. As another example, in many wireless systems, the same transmitted signal arrives at the receiver at different times, that is, having traveled different lengths due to reflections in the channel between the transmitter and receiver; each different arrival of the same originally-transmitted signal is typically referred to as a multipath. Typically multipaths interfere with one another, which is sometimes referred to as intersymbol interference ("ISI") because each path includes transmitted data referred to as symbols. Nonetheless, the orthogonality implemented by OFDM considerably reduces ISI and, as a result, often a less complex receiver structure, such as one without an equalizer, may be implemented in an OFDM system. Lastly, note that OFDM also has been used in mobile wireless communications, and is currently being developed in various respects including in combination with other wireless communication techniques.

While OFDM communications have proven useful and indeed beneficial in various contexts, the present inventors have recognized certain drawbacks in OFDM. For example, in present OFDM applications, data are transmitted in a form that is sometimes referred to as an OFDM symbol, which is a collection of parallel data assigned to different sub-carriers and communicated as a group. Within this OFDM symbol some of the sub-carriers carry data that is not user data but instead that is control data that describes to the receiver information about the coding and modulation scheme then being used by the transmitter. These control data are sometimes referred to as training tones or training control data and part of the information they carry is sometimes referred to as a code parameter set ("CPS") or generally as transmission parameter signaling. In present OFDM systems, however, the present inventors have observed that the CPS information provided by the training tones is relatively stagnant. Particularly, a typical OFDM system repeatedly communicates the same CPS information in every $N^{th}$ successive OFDM symbols, where N equals three. For example, often a transmitter will maintain the same CPS information for all operating time between successive resets. Then, at each reset event, each receiver must be put in some neutral state while the transmitter begins to transmit a new set of CPS information with each $N^{th}$ successively-transmitted OFDM symbol. Thereafter, each receiver then operates according to the new CPS information. Further, because all receivers operate according to the same CPS information, then typically the transmitter selects the CPS information so as to accommodate the weakest communication channel existing among all of the receivers. As a result, subsequent communications to all receivers are based on this worst-case-established CPS and, thus, performance with respect to the receivers that could benefit from different CPS information are instead constrained by the performance of the weakest channel. Also as a result of the above-described manner of communicating CPS information, there is limited flexibility in what may be described by the CPS information. In contrast, the preferred embodiments seek to increase the scope of flexibility provided by CPS and other control information, which brings still other benefits, all of which are discussed in greater detail below.

BRIEF SUMMARY OF THE INVENTION

In the preferred embodiment, there is a wireless transmitter. The transmitter comprises circuitry for providing a plurality of control bits and circuitry for providing a plurality of user bits. The transmitter also comprises circuitry for modulating the plurality of control bits and the plurality of user bits into a stream of complex symbols and circuitry for converting the stream of complex symbols into a parallel plurality of complex symbol streams. The transmitter also comprises circuitry for performing an inverse fast Fourier transform on the parallel plurality of complex symbol streams to form a parallel plurality of OFDM symbols and circuitry for converting the parallel plurality of OFDM symbols into a serial stream of OFDM symbols. Each OFDM symbol in the serial stream of OFDM symbols comprises a plurality of data points, and selected OFDM symbols in the serial stream of OFDM symbols carry modulation information. The modulation information in one or more of the selected OFDM symbols comprises a plurality of modulation groups, and the plurality of modulation groups comprises a number of modulation parameters that describe modulation of a corresponding set of data points in a subsequent OFDM symbol in the serial stream of OFDM symbols. Other aspects are also disclosed and claimed.

DETAILED DESCRIPTION OF THE INVENTION

Figure 1:
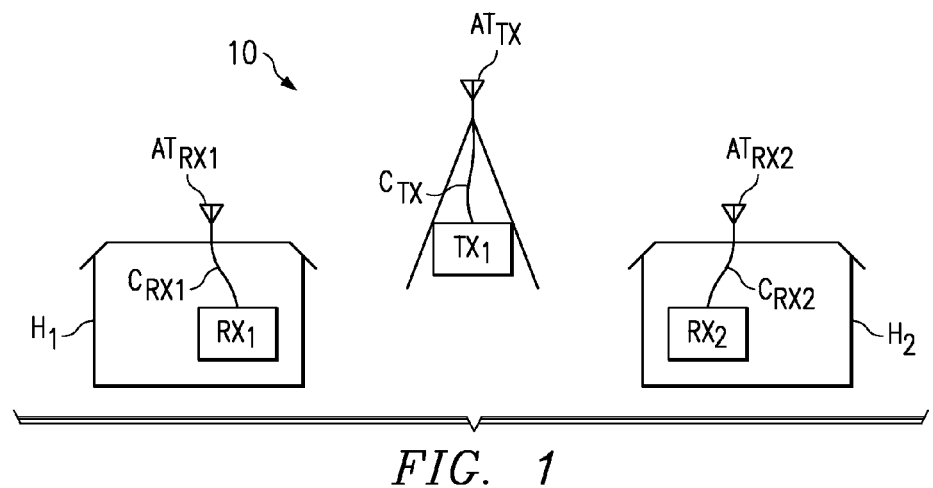
FIG. 1 illustrates a diagram of a wireless communications system by way of a contemporary orthogonal frequency division multiplexing ("OFDM") example in which the preferred embodiments operate.

FIG. 1 illustrates a diagram of a wireless communications system 10 by way of a contemporary orthogonal frequency division multiplexing ("OFDM") example in which the preferred embodiments operate. Within system 10 is shown a transmitter $TX_1$, sometimes referred to as a head end. Transmitter $TX_1$ is coupled by way of a conductor $C_{TX}$ to a transmit antenna $AT_{TX}$, through which transmitter $TX_1$ transmits OFDM signals. Also within system 10 are two receivers $RX_1$ and $RX_2$, where for sake of example consider that each receiver is a wireless modem ("WM") such as in a computer or other computing or data device. Such devices are sometimes referred to as customer premise equipment ("CPE"). System 10 is a fixed wireless system, meaning at least the latter portion of the transmission distance (e.g., on the order of a few miles) is fixed by virtue of a fixed location for each receiver; thus, each receiver $RX_1$ and $RX_2$ is shown by way of example as relating to a respective house $H_1$ and $H_2$. Each receiver $RX_1$ and $RX_2$ is coupled via a respective conductor $C_{RX1}$ and $C_{RX2}$ to a respective receive antenna $AT_{RX1}$ and $AT_{RX2}$. The inclusion of the preferred embodiments in system 10 as a fixed wireless system is preferred due to certain attributes of OFDM. Specifically and by way of contrast in mobile environments, there is a greater time-variation in the channel between a transmitter and a receiver, and such a variation diminishes the benefits of the orthogonality in the OFDM communications. Thus, the preferred embodiments have particular benefit in a fixed system, but one skilled in the art also may apply the present inventive teachings in a mobile OFDM system, where preferably such a system also contemplates the additional complexities arising from the channel variance that accompanies a mobile system. Lastly, note that FIG. 1 only illustrates the last distance of transmission in system 10, that is, from transmitter $TX_1$ to receivers $RX_1$ and $RX_2$. In actuality, such a system will include other aspects not shown in FIG. 1, such as a wireless access termination station ("WATS") which communicates with a backbone network. Given those additional devices, the WATS transmits to transmitter $TX_1$, and from these signals transmitter $TX_1$ transmits responsive signals to receivers $RX_1$ and $RX_2$.

Figure 2:
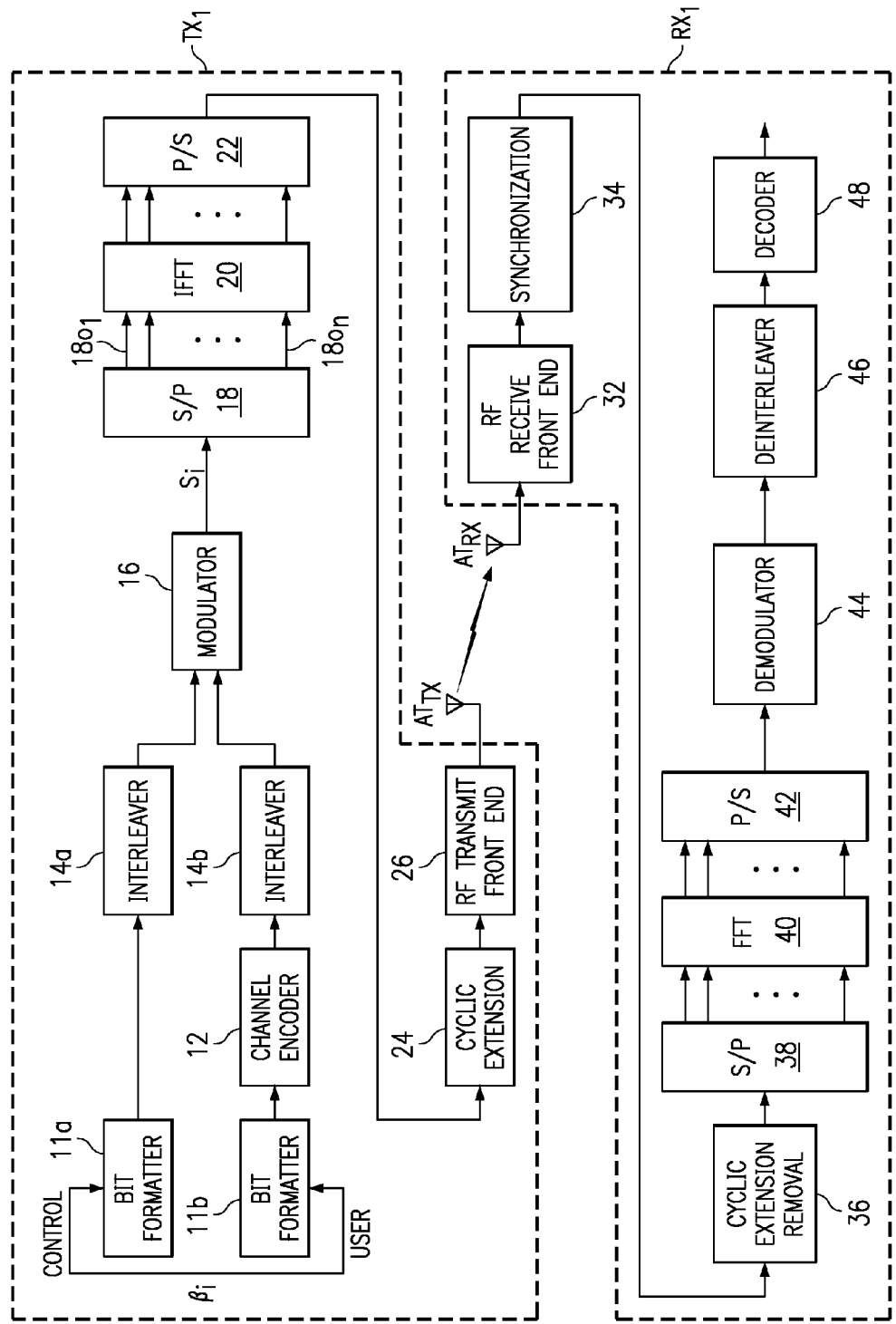
FIG. 2 illustrates an electrical block diagram of transmitter and one of the receivers from FIG. 1.

By way of further introduction to OFDM structure and operation as well as the improvements implemented by the preferred embodiments, FIG. 2 illustrates an electrical block diagram of transmitter $TX_1$ and one of the receivers (e.g., $RX_1$) from FIG. 1. For the sake of simplifying the discussion, each of these devices is described separately, below.

With reference to transmitter $TX_1$, in various respects it resembles the prior art, but in manners discussed below it differs from the prior art and indeed is improved overall due to the manner in which it communicates control information to a receiver. Turning then to transmitter $TX_1$, it receives information bits $B_i$ into respective bit formatters 11a and 11b. Bits $B_i$ may be provided by various known types of circuitry and those bits include both user data (e.g., voice, text, or other user-created data) as well as control data; with respect to the latter, certain of the control data in an OFDM system describes to the receiver information about the coding and modulation scheme then being used by the transmitter. These control data are sometimes referred to as training tones or training control data, the word "training" because it carries information to set up the receiving device which initially operates blindly without such information, and the word "control" because the data generally corresponds to the control of parameters corresponding to the physical layer of communication. Note that other control data can also be sent over the actual user data which then is parsed by a higher layer such as the medium access control ("MAC"). In any event, part of the information carried by the control information is sometimes referred to as a code parameter set ("CPS"). In the preferred embodiment, and as detailed later, the scope of the control information and the periodicity at which that information changes are provided in inventive manners. In any event, both the user data and the control data are intended to be included within bits $B_i$, where as shown in FIG. 2 the control data is input to bit formatter 11a and user data is input to bit formatter 11b. Bit formatter 11a operates with respect to the control data as known in the art such as to attach a cyclic redundancy check ("CRC") mechanism to the bits and to apply any desired format. Bit formatter 11b orders the user data according to an inventive manner detailed later. Bits $B_i$ are output by bit formatter 11b to a channel encoder 12. Channel encoder 12 encodes the information bits $B_i$ in an effort to improve raw bit error rate, where various encoding techniques may be used. Preferably, therefore, channel encoder 12 performs forward error correction ("FEC"), and in the current embodiment, the channel encoder uses a concatenated coding scheme wherein it uses a Reed-Solomon (RS) encoder operating on data bytes, followed by a convolutional interleaver which interleaves the data bytes output by the RS encoder which is in turn followed by a convolutional encoder. In doing the concatenated encoding, the channel encoder 12 uses modulation parameters such as coding rate for the convolutional encoder, the convolutional interleaver depth, and the number of parity bytes added by the RS encoder. It is also possible to change the channel encoder 12 to use a different coding scheme such as a Turbo encoder in a future version of the embodiment The appropriate parameters used by the coding scheme are indicated in the signal to receiver $RX_1$ by way of control data so that when received by that receiver it may use the same parameters to demodulate the complex symbols for better performance. The encoded output of channel encoder 12 is coupled to the input of an interleaver 14b. Interleaver 14b operates with respect to a block of encoded bits and shuffles the ordering of those bits so that the combination of this operation with the encoding by channel encoder 12 exploits the time diversity of the information. For example, one shuffling technique that may be performed by interleaver 14b is to receive bits in a matrix fashion such that bits are received into a matrix in a row-by-row fashion, and then those bits are output from the matrix to a modulator 16 in a column-by-column fashion. In the preferred embodiment, interleaver 14b has a block matrix bit interleaving size of 18. Comparably, the output of bit formatter 11a is connected to an interleaver 14a, where interleaver 14a operates to interleave the control signal in one of various fashions that may differ with respect to the manner in which the user signal is interleaved by interleaver 14b. In any event, the output of interleaver 14a is also connected to modulator 16. Modulator 16 is in effect a symbol mapper in that it converts its input bits to complex symbols, each designated generally as $s_i$. The converted symbols may take various forms, such as quadrature phase shift keying ("QPSK") symbols, binary phase shift keying ("BPSK") symbols, or quadrature amplitude modulation ("QAM") symbols. Note that modulator 16 might operate differently with respect to the user data and the control data. In addition, note that modulator 16 may operate on the bits with respect to certain modulation parameters, where these parameters are detailed later and are indicated in the signal by way of control data so that when received by a receiver it may use the same parameters to demodulate the complex symbols. For example, one such type of parameter is the number of bits to a symbol mapping. Each symbol $s_i$ is coupled to a serial-to-parallel converter 18. In response, serial-to-parallel converter 18 receives the incoming symbols and outputs n symbols in a parallel stream, along its outputs $18o_1$ through $18o_n$, to an inverse fast Fourier transform ("IFFT") block 20. IFFT block 20, as its name suggests, performs an IFFT on the parallel input data. The data in its form as output by IFFT block 20 is referred to in the art as an OFDM symbol, which is not to be confused with each complex symbol $s_i$ that is provided by modulator 16; indeed, the art also uses other terms for the OFDM symbol such as a burst. For the sake of consistency, in this document the term OFDM symbol is used, and the OFDM symbol as output from IFFT block 20 is connected to a parallel-to-serial converter 22. Parallel-to-serial converter 22 converts its parallel input to a serial output Thus, the OFDM symbol is now a serial stream of information, and that stream is connected to a cyclic extension block 24. Cyclic extension block 24 adds a prefix and often a postfix to the serial stream of data, where sometimes either or both of these are referred to in the art as a guard interval. The phrase "guard interval" is used because this added period or periods provides an additional guard against the effects of multipath delay. Particularly, so long as the guard interval is longer in period than the time between receipt of different multipaths, then the guard interval in each multipath may be removed from the data so that the effect of the overlapping receipt of signals is removed, thereby greatly improving the probability of properly decoding the remaining data. In any event, looking more specifically to the portions of the guard interval in OFDM, the prefix and postfix are copies of portions of the information from the OFDM symbol. Specifically, the prefix is a copy of a number of bits from the end of the OFDM symbol, and the postfix is a copy of a number of bits from the beginning of the OFDM symbol. The output of cyclic extension block 24 is connected to a radio frequency ("RF") transmit front end 26, which includes a digital-to-analog converter as well as other analog RF front-end circuitry. The digital-to-analog converter portion converts the digital input to an analog output, and the analog signal is conditioned and passed to transmit antenna $AT_{TX}$ for transmission to receiver $RX_1$ (and also receiver $RX_2$ in the case of FIG. 1).

Turning to receiver $RX_1$ in FIG. 2, in various respects it resembles the prior art, but in manners discussed below it differs from the prior art and indeed is improved overall due to the manner in which control information is communicated to it from a transmitter and how it uses that information to decipher sets of data points in the transmitted signals. Turning then to receiver $RX_1$, it receives the transmission from transmitter $TX_1$ at its receive antenna $AT_{RX1}$ and the corresponding electrical signal is connected to an RF receive front end 32. Front end 32 includes an analog-to-digital converter as well as other well-known analog RF receive front-end circuitry. The analog-to-digital converter portion converts the analog input to a digital output, and the digital signal is connected to a synchronization block 34. Synchronization block 34 is discussed in greater detail later insofar as it implements an invention function, but at this point by introduction note that OFDM communications require synchronization to the received signals and synchronization block 34 performs a number of OFDM synchronizations in the following order: (1) synchronization to the beginning of an OFDM symbol and removal of the cyclic prefix; (2) synchronization and removal of frequency error between the transmitter and the receiver; and (3) synchronization to the OFDM symbol carrying the CPS information and decoding of this information. As detailed later, such synchronization is achieved in the prior art by identifying the same set of training tones as they appear in every third OFDM symbol. However, in the preferred embodiments and also as detailed later, the same training tones are not transmitted every third OFDM symbol, and, thus an alternative methodology, such as correlation to a particular code, is implemented by the preferred embodiments. In any event, once synchronization block 34 identifies the location of each OFDM symbol, the result is passed to a cyclic extension removal block 36. Specifically, since synchronization block 34 has determined the location of the OFDM symbol as received as part of a transmission, then the prefix, and postfix if one is used, may be removed since those portions of the transmission are merely copies of the data used to overcome the effects of multipath delay. Accordingly, cyclic extension removal block 36 operates in this respect, leaving only the OFDM symbol as the remaining information. This remaining information is output to a serial-to-parallel converter 38. Serial-to-parallel converter 38 converts its serial input to a parallel output, where the number n of outputs corresponds to the same number of n parallel outputs provided by serial-to-parallel converter 18 of transmitter $TX_1$. These n outputs from serial-to-parallel converter 38 are connected to a fast Fourier transform ("FFT") block 40. As its name suggests, FFT block 40 performs an FFT on the parallel input data, thereby reversing the effect imposed on the information by IFFT block 20 of transmitter $TX_1$. As a result, the output of FFT block 40 provides a parallel set of complex symbols which, assuming proper operation, correspond to and thus are the same as (or are estimates of the complex symbols provided by modulator 16 of transmitter $TX_1$. The output of FFT block 40 is connected to a demodulator 44, which removes the modulation imposed on the signal by modulator 16 of transmitter $TX_1$. In other words, therefore, whatever type of symbol mapping was implemented by modulator 16, then demodulator 44 performs in effect an inverse of that operation to return the digital bit data. Moreover, as detailed later, the preferred embodiments indicate various modulation parameters in the communicated signal from transmitter $TX_1$ to receiver $RX_1$; thus, these parameters are used by demodulator 44 to perform its demodulation functionality. The output of demodulator 44 is connected to a deinterleaver 46. Deinterleaver 46 performs an inverse of the function of interleaver 14 of transmitter $TX_1$, and the output of deinterleaver 46 is connected to a channel decoder 48. Channel decoder 48 further decodes the data received at its input, typically operating with respect to certain error correcting codes, and it performs these operations also in part in response to modulation parameters received from transmitter $TX_1$ in the control data of its transmitted signal. Channel decoder 48 outputs a resulting stream of decoded data. Finally, the decoded data output by channel decoder 48 may be received and processed by additional circuitry in receiver $RX_1$, although such circuitry is not shown in FIG. 2 so as to simplify the present illustration and discussion.

Figure 3:
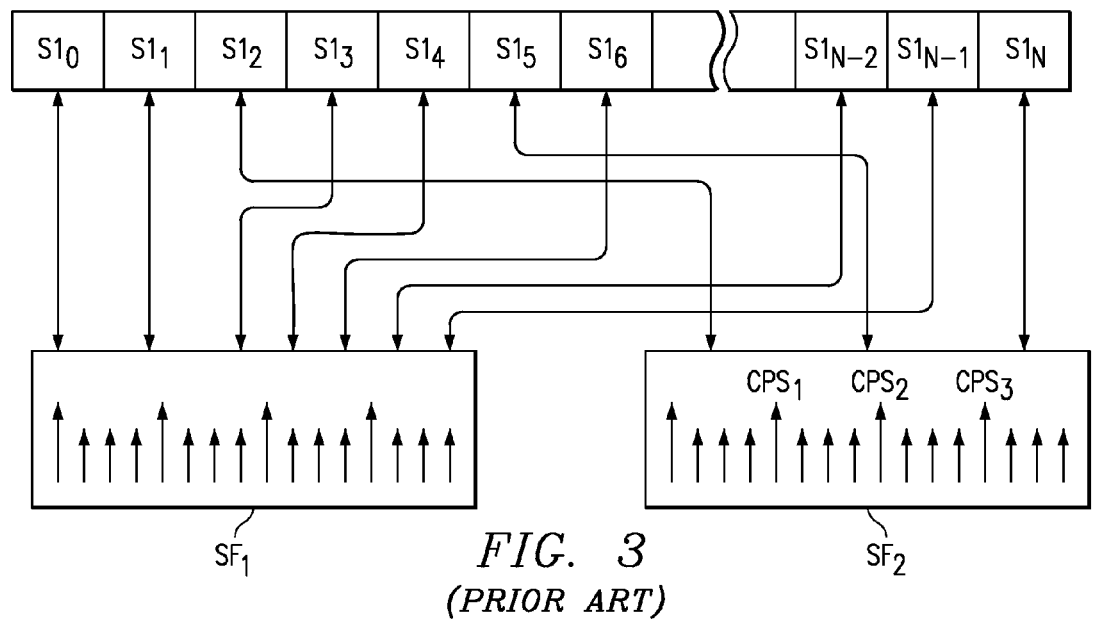
FIG. 3 illustrates a diagram of the data in a first sequence of N+1 sequential OFDM symbols designated $S1_0$ through $S1_N$ and as communicated according to the prior art.

One aspect according to the preferred embodiment relates to ordering of bits $B_i$ by bit formatter 11 for the transmission of the control information in the OFDM symbols in an inventive manner, and to better appreciate this aspect attention is now directed in further detail to the transmission of training tones according to the OFDM prior art. Specifically, FIG. 3 illustrates a diagram of the data in a first sequence of N+1 sequential OFDM symbols designated $S1_0$ through $S1_N$ and as communicated according to the prior art, where N+1 is a multiple of three. For the sake of simplifying the illustration, it is assumed that each OFDM symbol is already processed by a receiver through its FFT operation and any guard interval has been removed. As further detailed below, each symbol $S1_x$ in the prior art takes one of two forms $SF_1$ or $SF_2$, where those forms differ in that the control data of form $SF_1$ does not include CPS information while the control data of form $SF_2$ does include CPS information. Further, a dual-tipped arrow is shown from each OFDM symbol $S1_0$ through $S1_N$ to demonstrate the form it takes, so that it may be seen that every third OFDM symbol $S1_2$, $S1_5$, ... $S1_N$ takes the form $SF_2$, while the remaining symbols take the form $SF_1$. With reference to symbol forms $SF_1$ and $SF_2$, they are illustrated to include a number of vertical arrows intended to illustrate data points across the frequency spectrum encompassed by each symbol; in other words, recalling that OFDM communications are along different frequency sub-carriers, then each different vertical arrow within an illustrated OFDM symbol is a data point corresponding to one of the different frequency sub-carriers of the OFDM symbol. Thus, the illustration is akin to a frequency spectral plot, as the data would appear after the operation of FFT block 40 of receiver $RX_1$. Note that the number of data points is shown as 16 only by way of example, when in fact the number of sub-carriers encompassed by an OFDM symbol may be on the order of 256 or 512, or even more sub-carriers.

FIG. 3 is further intended to depict the existence of both control data points and user data points in each OFDM symbol. Specifically, certain data points, at the same sub-carrier location for each OFDM symbol, are control data points, where these control data points are shown using taller vertical arrows than the remaining vertical arrows (i.e., data points) in each OFDM symbol. The remaining shorter arrows are intended to illustrate user data points. By way of example, each OFDM symbol includes four control data points, and the fixed sub-carrier location for each such control data point is hereafter referred to as a control data point sub-carrier. Note also that the choice of four control data points is only by way of a simple example when in fact the number of control points is typically larger for the case when the OFDM symbol has 256 (or more) data points. With further reference to the taller vertical arrows indicating control data points, recall that every third OFDM symbol in the N+1 sequence takes the form $SF_2$. In the form $SF_2$, each of the control data points other than the first control data point in the OFDM symbol includes a designation of $CPS_x$ above the arrow, that is, the three latter control data points are shown to correspond to $CPS_1$, $CPS_2$, and $CPS_3$. These designations are intended to illustrate that each such control data point includes particular CPS information communicated by that control data point from the transmitter to the receiver. In contrast, for the remaining OFDM symbols which recall are of the form $SF_1$, the control data therein does not include nor illustrate any such CPS information. Note also that the first control data point in each form $SF_2$ OFDM symbol does not include CPS information because that control data point may be unreliable for detection due to filtering in the receiver.

Having introduced the prior art format of a sequence of OFDM symbols, attention is now directed to certain prior art uses of the control data included in the form $SF_1$, which recall is in every two out of three OFDM symbols in a sequence of OFDM symbols. Specifically, the control data that does not include CPS information represents fixed data, that is, its value as transmitted is fixed and is therefore known to the receiver before it is received. As a result, when an OFDM symbol including such data is received, the receiver can determine the channel effect based on the received signal in view of the known transmitted control data. This operation can be shown mathematically, letting y(k) be the received signal, H(k) be the channel effect, and c(k) being the known control data, as further shown in the following Equation 1:

$$y(k)=H(k)c(k) \qquad \text{Equation 1}$$

From Equation 1, since y is received by the receiver and c is known, then mathematically the receiver may solve for H, the channel effect on the received signal. The channel effect then may be used by the receiver for other purposes such as later refinement in its estimation of the user data. Further and as detailed later, the prior art also may use the known control data for purposes of synchronization.

Attention is now directed to certain prior art uses of the control data included in the form $SF_2$, which recall is in every third OFDM symbol in an OFDM sequence and includes CPS information. Once a receiver has received the CPS information, it may use that information to decode the user data points. For example, the CPS may identify the constellation size of the complex symbols transmitted, such as 4, 16, 32, and so forth. As another example, the CPS may identify a type of forward error correction ("FEC") to be used by the receiver. As still another example, the CPS may identify the type of interleaver format being implemented with a transmission. In any event, however, recall that the earlier Background Of The Invention section of this document discusses various drawbacks with the communication of CPS under the prior art, such as the relative stagnant nature of this information because in effect a transmitter routinely transmits the same CPS, as now shown to exist in every third OFDM symbol, for a considerably lengthy period of time (e.g., maintaining the same information for all time until a next system reset).

By way of further background, a discussion is now provided as to the prior art manner of determining, for each received OFDM symbol, whether it takes the form $SF_1$ or $SF_2$. In other words, given that a receiver receives a sequence of OFDM symbols, the receiver must determine if each OFDM symbol in the sequence is of form $SF_1$, having only control data points without CPS, or of form $SF_2$, having control data points including CPS. To determine the form $SF_1$ or $SF_2$ of an OFDM symbol, one prior art approach takes each received OFDM symbol and multiplies each control point sub-carrier in that symbol times the complex conjugate of the respective control point sub-carrier in the immediately preceding OFDM symbol. For example with reference to FIG. 3, when OFDM symbol $S1_1$ is received following OFDM symbol $S1_0$, then each control point sub-carrier in $S1_1$ is multiplied times the complex conjugate of the respective control point sub-carrier in $S1_0$. Similarly, when OFDM symbol $S1_2$ is received following OFDM symbol $S1_1$, then each control point sub-carrier in $S1_2$ is multiplied times the complex conjugate of the respective control point sub-carrier in $S1_1$. This process repeats for each OFDM symbol, where as detailed below the results of the complex conjugate multiplications indicate whether each OFDM symbol is of the form $SF_1$ or $SF_2$.

To further appreciate the effect of the above-described complex conjugate multiplication, consider that each control data point without CPS information in an OFDM symbol is the same, and may be represented as in the following Equation 2:

$$e^{j(\phi_x + h\phi_x)} \qquad \text{Equation 2}$$

In Equation 2, the phase shift term $\phi_x$ represents the phase component of the known control data point without CPS information, while the phase shift term $h\phi_x$ indicates an additional component in the received signal arising from the channel effect, h, between transmitter $TX_1$ and receiver $RX_1$. Additionally, in Equation 2, any amplitude of the OFDM symbol is ignored. Thus, for the four control data points in the form $SF_1$, they may be represented as in the following Equation 3:

$$e^{j(\phi_1 + h\phi_1)}, e^{j(\phi_2 + h\phi_2)}, e^{j(\phi_3 + h\phi_3)}, e^{j(\phi_4 + h\phi_4)} \qquad \text{Equation 3}$$

In contrast, the three latter control data points in the form $SF_2$ have added CPS information and, thus, they along with the first control data point in the form $SF_2$ which does not have CPS information, may represented in the following Equation 4:

$$e^{j(\phi_1 + h\phi_1)}, e^{j(\alpha_2 + h\phi_2)}, e^{j(\alpha_3 + h\phi_3)}, e^{j(\alpha_4 + h\phi_4)} \qquad \text{Equation 4}$$

Equation 4 mathematically demonstrates the expected result, that is, the control data in form $SP_2$ differs from form $SF_1$ due to the inclusion of the CPS information in form $SF_2$ such that the latter three control data points in Equation 4 are different than the corresponding Equation 3 control data points because the Equation 3 control points do not include CPS information.

Given Equations 3 and 4, the effects of the earlier-described complex-conjugate multiplication of successive symbol points now may be appreciated. For example, consider first the instance where the control data points of OFDM symbol $S1_1$ are multiplied time the complex conjugate of the respective control data points of OFDM symbol $S1_0$. Since both OFDM symbols $S1_0$ and $S1_1$ are of the form $SF_1$ as shown in Equation 3, then each such multiplication yields the product of a complex number times its own complex conjugate, assuming the channel effect, h, is relatively constant from the time between receipt of $S1_0$ and $S1_1$, as it most often is in a fixed system; one skilled in the art will appreciate that each such respective multiplication yields only a real number (relating to the multiplicand's amplitude) because any imaginary component is removed by such a multiplication. In contrast, consider second the instance where the control data points of OFDM symbol $S1_2$ are multiplied time the complex conjugate of the respective control data points of OFDM symbol $S1_1$, and for sake of simplification consider all the control data points other than the first one in each symbol so as to ignore the effect that the form $SF_2$ does not include CPS information in its first control data point. Thus, since the control data points in OFDM symbol $S1_2$, as shown in Equation 4, differ from $S1_1$, as shown in Equation 3, (because the former includes CPS information), then each respective multiplication yields a result with a non-negligible phase term (i.e., an imaginary component). Similarly, consider third the instance where the control data points of OFDM symbol $S1_3$ (e.g., Equation 3) are multiplied time the complex conjugate of the respective control data points of OFDM symbol $S1_2$ (e.g., Equation 4); once more the control data points differ because $S1_3$ does not include CPS information while $S1_2$ does, and again therefore then each respective multiplication yields a result with a non-negligible phase term. Lastly, consider fourth the instance where the control data points of OFDM symbol $S1_4$ (e.g., Equation 3) are multiplied time the complex conjugate of the respective control data points of OFDM symbol $S1_3$ (e.g., also Equation 3). Since both OFDM symbols $S1_4$ and $S1_3$ are of the form $SF_1$, then each respective multiplication yields the product of a complex number times its own complex conjugate, leaving a product with only a real number. Given the preceding, the prior art sums the results of each multiplication of each respective control point pair for a pair of compared OFDM symbols. Thus, such a sum will be at a maximum when two successive form $SF_1$ symbols are compared by the above-described multiplication process, because that sum will include only the real values realized from each multiplication; conversely, the sum will be smaller for any multiplication between a form $SF_1$ and form $SF_2$ symbol since the products of those operations will include non-negligible imaginary terms. As a result, therefore, for each series of three successive OFDM symbols, the timing of a determined maximum will thereby correspond to an incident where two form $SF_1$ symbols have been received, and from that knowledge it is further known from the format of FIG. 3 that the next OFDM symbol (i.e., following the two detected form $SF_1$ symbols) will be a form $SF_2$ symbol. Given that knowledge, it is further known that the control data points in that next OFDM symbol (i.e., of form $SF_2$) will include CPS information and, therefore, that next OFDM symbol may be further analyzed to detect the CPS information as such detection is further detailed below. Thereafter, the use of the CPS information may be for any of the various purposes described above. In addition, the knowledge presented by the above-described peaks also serve to identify the location of the beginning of each received OFDM symbol.

Having demonstrated how the prior art determines whether each OFDM symbol is of the form $SF_1$ or $SF_2$, attention is now directed to the detection of the CPS information according to the prior art, which also provides further background for the later discussion of the preferred embodiments. First, recall that the CPS information is embodied in each term $\alpha_x$ in Equation 4. Second, since each value $\phi_x$ is known, then one manner of determining each value $\alpha_x$ would be first to solve for the channel effect, h, and then solving for the remaining unknown term $\alpha_x$ in Equation 4. For example, the channel effect, h, could be determined by multiplying each term in Equation 3 times the respective item in the following Equation 5:

$$e^{-j(\phi 1)}, e^{-j(\phi 2)}, e^{-j(\phi 3)}, e^{-j(\phi 4)} \qquad \text{Equation 5}$$

Such a multiplication would yield the results shown in the following Equation 6:

$$e^{j(h\phi 1)}, e^{j(h\phi 2)}, e^{j(h\phi 3)}, e^{j(h\phi 4)} \qquad \text{Equation 6}$$

Thus, in Equation 6, each value $\phi_x$ is known, so the remaining value h may be determined. Once h is determined in such a manner, it may be used with Equation 4 to determine each value of $\alpha_x$, that is, to determine the CPS information.

While the preceding description of detecting the CPS information in $\alpha_x$ represents a workable approach, the prior art has provided an alternative that requires fewer computations. Specifically, in the art, it is known to make the substitution shown in Equation 7 for $\alpha_x$ in Equation 4:

$$\alpha_x = CPS_x + \phi_x \qquad \text{Equation 7}$$

For example, by substituting the definition of $\alpha_x$ from Equation 7 into the elements of Equation 4, then the following Equation 8 is realized for the form $SF_2$ OFDM symbol:

$$e^{j(\alpha 1+h\phi 1)} = e^{j(CPS1+\phi 1+h\phi 1)}, e^{j(CPS2+\phi 2+h\phi 2)}, e^{j(CPS3+\phi 3+h\phi 3)}, e^{j(CPS4+\phi 4+h\phi 4)} \qquad \text{Equation 8}$$

Now, recall from above that to locate the forms $SF_1$ and $SF_2$ within a stream of OFDM symbols, multiplication is performed between the control data points in an OFDM symbol with the complex conjugates of the respective control data points in the immediately-previous OFDM symbol. Thus, when a form $SF_1$ OFDM symbol is received immediately following another form $SF_1$ OFDM symbol, then the result is the same as described earlier, that is, the phase terms are removed and a maximum amplitude is achieved. However, when an $SF_2$ OFDM symbol is received, and recalling that from the pattern of FIG. 3 that such an OFDM symbol follows an $SF_1$ OFDM symbol, then the multiplication, with respect to respective control data points, of that $SF_2$ OFDM symbol times the complex conjugate of the immediately-preceding $SF_1$ OFDM symbol, realizes the following Equation 9:

$$e^{-j(\phi x + h\phi x)} \times e^{j(CPSx + \phi x + h\phi x)} = e^{j(CPSx)} \qquad \text{Equation 9}$$

From Equation 9, it may be seen that the terms $\phi_x$ and $h\phi_x$ cancel out, leaving only the phase indication of $CPS_x$. In other words, due to the substitution of Equation 7, then the same multiplication process that identifies the location of each $SF_2$ OFDM symbol at the same time also produces the value of $CPS_x$ for each such OFDM symbol. Thus, the CPS information results from the same complex conjugate multiplication step used to identify the locations of the $SF_1$ and $SF_2$ form OFDM symbols and, hence, there is no need to separately solve for h as described above with respect to Equations 5 and 6.

Figure 4:
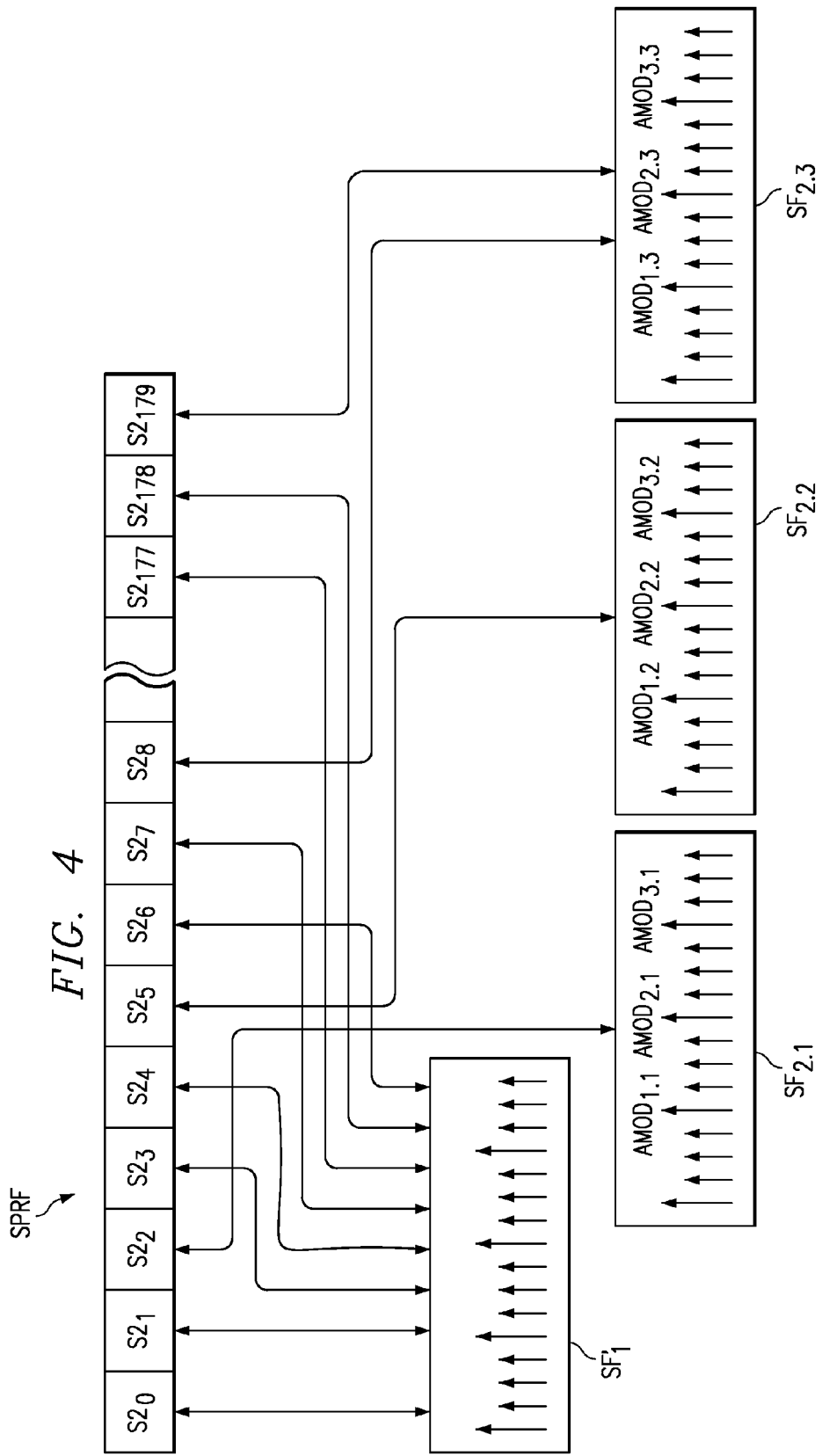
FIG. 4 illustrates a diagram of the data in a sequence of N+1 sequential OFDM symbols forming a superframe according to the preferred embodiment.

Turning now to additional aspects of the preferred embodiments, FIG. 4 illustrates a diagram of the data transmitted and received in an inventive sequence of N+1 sequential OFDM symbols designated $S2_0$ through $S2_N$, where for reasons described below N=179 in the preferred embodiment (i.e., the stream includes N+1=180 OFDM symbols) and where the form of superframe SPRF is provided at least in part by formatter 11 in FIG. 2. As in the case of FIG. 3, but here with respect to the preferred embodiments, assume for the sake of simplifying the illustration that each OFDM symbol is represented in the frequency domain and without a guard interval, that is, either as it would appear at the output of IFFT 20 prior to transmission or at the output of FFT block 40 after being received and partially processed. For the sake of reference and as processed according to the preferred embodiment, the sequence of 180 OFDM symbols in FIG. 4 is referred to as a superframe SPRF. In the preferred embodiments and for reasons discussed later, superframe SPRF has a number of OFDM symbols equal to an integer multiple of three and also equal to an integer multiple of the bit interleaving size of interleaver 14; recall from FIG. 2 that interleaver 14 in the preferred embodiment has an interleaving size of 18 and, thus, in FIG. 4 superframe SPRF has a number of OFDM symbols equal to the integer 10 times this interleaving capacity. In the preferred embodiment, for every group of three OFDM symbols, and with respect to the absence of CPS information, the first two OFDM symbols take a form $SF_1'$ which is comparable in various respects to form $SF_1$ of the prior art Specifically, in the preferred embodiment, the form $SF_1'$ OFDM symbols include user data points and evenly-spaced control data points shown by shorter and longer vertical arrows, respectively, where the control data points do not include CPS information. As detailed later, however, in the preferred embodiment each second of the first two $SF_1'$ OFDM symbols in a group of three OFDM symbols includes additional information for purposes of synchronization. Looking now to every third OFDM symbol of superframe SPRF, it has a form that is comparable in some respects to form $SF_2$ but also that provides additional diversity. These aspects are detailed below.

To further understand every third OFDM symbol in superframe SPRF, attention is first turned by way of example to OFDM symbol $S2_2$. Specifically, as shown by a dual-tipped arrow in FIG. 4, OFDM symbol $S2_2$ takes a form $SF_{2.1}$. At first glance, form $SF_{2.1}$ is comparable to form $SF_2$ of FIG. 3, but note that form $SF_{2.1}$ preferably includes information that differs from the prior art CPS information. Specifically, form $SF_{2.1}$ includes both user data points shown as smaller vertical arrows and evenly-spaced control data points shown as taller vertical arrows. However, with respect to all control data points other than the first control point, they include what is referred to herein as adaptive modulation ("AMOD") information, which includes CPS information, but as its name suggests, which also permits changes (i.e., it is adaptive) in modulation parameters across different superframes as further detailed later. Accordingly, in this document, each OFDM symbol of the form $SF_{2.1}$ may be referred to as an AMOD-carrying OFDM symbol. In the preferred embodiment, the AMOD information is modulated on the control data points in the same manner as described above with respect to the CPS information and in connection with Equations 7 and 8 and, thus, for the AMOD information Equation 7 may be re-written as the following Equation 10:

$$\alpha_x = AMOD_x + \phi_x \qquad \text{Equation 10}$$

In addition, the AMOD information may include information beyond CPS information, as also detailed later. At this point and for the sake of illustrating the AMOD information, each taller vertical arrow (i.e., control point) in form $SF_{2.1}$, other than the first taller arrow, points to a corresponding label of $AMOD_{1.1}$, $AMOD_{2.1}$, and $AMOD_{3.1}$, where the subscript number preceding the decimal in each such designation is intended to indicate a different AMOD value per control point, and where the subscript number following the decimal in each such designation is intended to indicate that the AMOD information corresponds to the form $SF_{2.1}$ symbol in the superframe. As shown below, for other values of x having a corresponding form $SF_{2.x}$, different values of AMOD information $AMOD_{1.x}$, $AMOD_{2.x}$, and $AMOD_{3.x}$, are provided by the corresponding AMOD-carrying OFDM symbol, and these other OFDM symbols are also referred to as AMOD-carrying OFDM symbols. In any event, therefore, given the forms $SF_{2.1}$, $SF_{2.2}$, and $SF_{2.3}$, for each successive AMOD-carrying OFDM symbol in superframe SPRF, it carries different AMOD information than the immediately preceding AMOD-carrying OFDM symbol. Lastly, note that presently in the preferred embodiment, each AMOD-carrying control point may carry two bits of AMOD information.

Looking further now to the contrast of the preferred embodiment with the prior art and continuing with FIG. 4, attention is directed to OFDM symbol $S2_5$, that is, the second AMOD-carrying OFDM symbol in superframe SPRF. As now shown, the AMOD information in AMOD-carrying OFDM symbol $S2_5$ differs from the AMOD information in the immediately preceding AMOD-carrying OFDM symbol, namely, $S2_2$. Specifically, OFDM symbol $S2_5$ takes a form $SF_{2.2}$, which represents a comparable format to form $SF_{2.1}$. However, the subscript number of the form $SF_{2.2}$ following the decimal indicates a value of 2 to correspond to the AMOD information $AMOD_{1.2}$, $AMOD_{2.2}$, and $AMOD_{3.2}$ that is included within respective control data points of OFDM symbol $S2_5$. Thus, this AMOD information differs from the AMOD information $AMOD_{1.1}$, $AMOD_{2.1}$, and $AMOD_{3.1}$ that is included in form $SF_{2.1}$ of AMOD-carrying OFDM symbol $S2_2$. Similarly, with reference to the third AMOD-carrying OFDM symbol in superframe SPRF (i.e., OFDM symbol $S2_8$), it takes the form $SF_{2.3}$ which includes AMOD information $AMOD_{1.3}$, $AMOD_{2.3}$, and $AMOD_{3.3}$, which therefore differs from the AMOD of both OFDM symbol $S2_2$ having the form $SF_{2.1}$ and OFDM symbol $S2_5$ having the form $SF_{2.2}$.

For the sake of the remaining discussion in this document, and having established that the AMOD information in forms $SF_{2.1}$, $SF_{2.2}$, and $SF_{2.3}$ differs, then those forms when combined may be thought of as forming a single AMOD message. As further shown below, this AMOD message may contain various parameters. Also in the preferred embodiment and as detailed later, the AMOD message includes multiple groups of AMOD information, where each AMOD group includes the same types of parameters and those parameters apply to a set of data points identified by the group, but the values of those parameters may differ for each different AMOD group. From this format and also as detailed later, each different AMOD group may correspond to a different set of data points, so that by way of example a first AMOD group provides the modulation information corresponding to how a first set of control points were modulated when transmitted (and how they therefore can be demodulated upon receipt), while a second AMOD group provides the modulation information corresponding to how a second set of control points were modulated when transmitted (and how they therefore can be demodulated upon receipt), and possible additional AMOD groups in the same manner. As a result, in the preferred embodiment, each AMOD message, as provided in a single superframe, may include multiple AMOD groups, each corresponding to a different set of corresponding data points.

Completing FIG. 4 and looking to the last three OFDM symbols in superframe SPRF, they again represent a sequence of three OFDM symbols, where the first two of the three OFDM symbols, namely, $S2_{177}$ and $S2_{178}$, take the form $SF_1'$. The last OFDM symbol in that group of OFDM symbols, namely, $S2_{179}$, does not take the form $SF_1'$ because it also includes AMOD information in all but the first of its control points. In one embodiment, such AMOD information may differ from the AMOD information in all of the preceding AMOD-carrying OFDM symbols in superframe SPFR (i.e., $S2_2$, $S2_5$, $S2_8$, . . . $S2_{176}$). In this case, a single AMOD message is provided by all 60 of the AMOD-carrying OFDM symbols in superframe SPRF. However, in the preferred embodiment, at some point the AMOD message carried by multiple AMOD-carrying OFDM symbols in superframe SPFR is repeated within that same superframe SPFR. In other words, the AMOD message is formed by numerous AMOD-carrying OFDM symbols in the superframe, but it is completed in less than the entirety of the 60 AMOD-carrying OFDM symbols in the superframe. For example, consider an instance where each OFDM symbol includes 16 control data points, so all 15 of the latter control data points include AMOD information; assume further that the entirety of the AMOD message sought to be included in superframe SPFR can be expressed in a total of 45 control data points. As a result, since three successive AMOD-carrying OFDM symbols can provide 45 control data points (i.e., 15 control data points/symbol*3 symbols=45) worth of AMOD information, then once three such AMOD-carrying OFDM symbols are provided (which occurs after a total of nine OFDM symbols pass since every third symbol is an AMOD-carrying symbol), then the AMOD message is complete as of that time. Accordingly, in the preferred embodiment, the AMOD message is then repeated starting with the next AMOD-carrying OFDM symbol. In other words, by applying this example to FIG. 4, then AMOD-carrying OFDM symbols $S2_2$, $S2_5$, and $S2_8$ would together provide the desired AMOD message, and the next AMOD-carrying OFDM symbol $S2_{11}$ would carry the same AMOD information as OFDM symbol $S2_2$, that is, OFDM symbol $S2_{11}$ would take the form $SF_{2.1}$. Continuing this example, OFDM symbol $S2_{14}$ would take the form $SF_{2.2}$, and OFDM symbol $S2_{17}$ would take the form $SF_{2.3}$; thus, the entirety of OFDM symbols $S2_{11}$, $S2_{14}$, and $S2_{17}$ would be a repetition of the same AMOD message in OFDM symbols $S2_2$, $S2_5$, and $S2_8$. FIG. 4 also completes this example with respect to OFDM symbol $S2_{179}$, namely, because it is the third AMOD-carrying OFDM symbol in the sequence of $S2_{173}$, $S2_{176}$, and $S2_{179}$, then this sequence again repeats the AMOD message wherein OFDM symbol $S2_{173}$ takes the form $SF_{2.1}$, OFDM symbol $S2_{176}$ takes the form $SF_{2.2}$, and OFDM symbol $S2_{179}$ takes the form $SF_{2.3}$. Naturally, if the AMOD message requires more or less than three AMOD-carrying OFD symbols to complete within superframe SPFR or if a different amount of AMOD information may be communicated per AMOD-carrying OFDM symbol, then the number of forms $SF_{2.x}$ are adjusted accordingly.

Given the preceding discussion of FIG. 4, one skilled in the art should appreciate that for a collection of OFDM symbols according to the preferred embodiment, such as in superframe SPFR, they include a same number of control data points as the prior art, but in that same number of data points a much greater amount of AMOD information may be carried as opposed to the CPS information carried by the prior art. Accordingly, in the preferred embodiment the AMOD information varies as between every third OFDM symbol, whereas in the prior art generally every third OFDM symbol in a sequence of numerous OFDM symbols included the same CPS information. Indeed, recall it is stated much earlier that the prior art might maintain the same CPS information between successive resets. Thus, in the prior art, thousands and even millions of successive OFDM symbols may be communicated between a transmitter and receiver where each third OFDM symbol communicates the same CPS information. In contrast, the preferred embodiment can vary its AMOD information as between successive AMOD-carrying OFDM symbols. Thus, the preferred embodiment contemplates changes in the control information (i.e., the AMOD) between every third OFDM symbol whereas the prior art repeats the same control information (i.e., the CPS) for lengthy periods of time. Given this capability of the preferred embodiment, one further aspect that is preferred is to define sets of data points within the OFDM symbols and to have each such set correspond to a different group of AMOD information; this aspect is illustrated in connection with FIG. 5, as described below.

Figure 5:
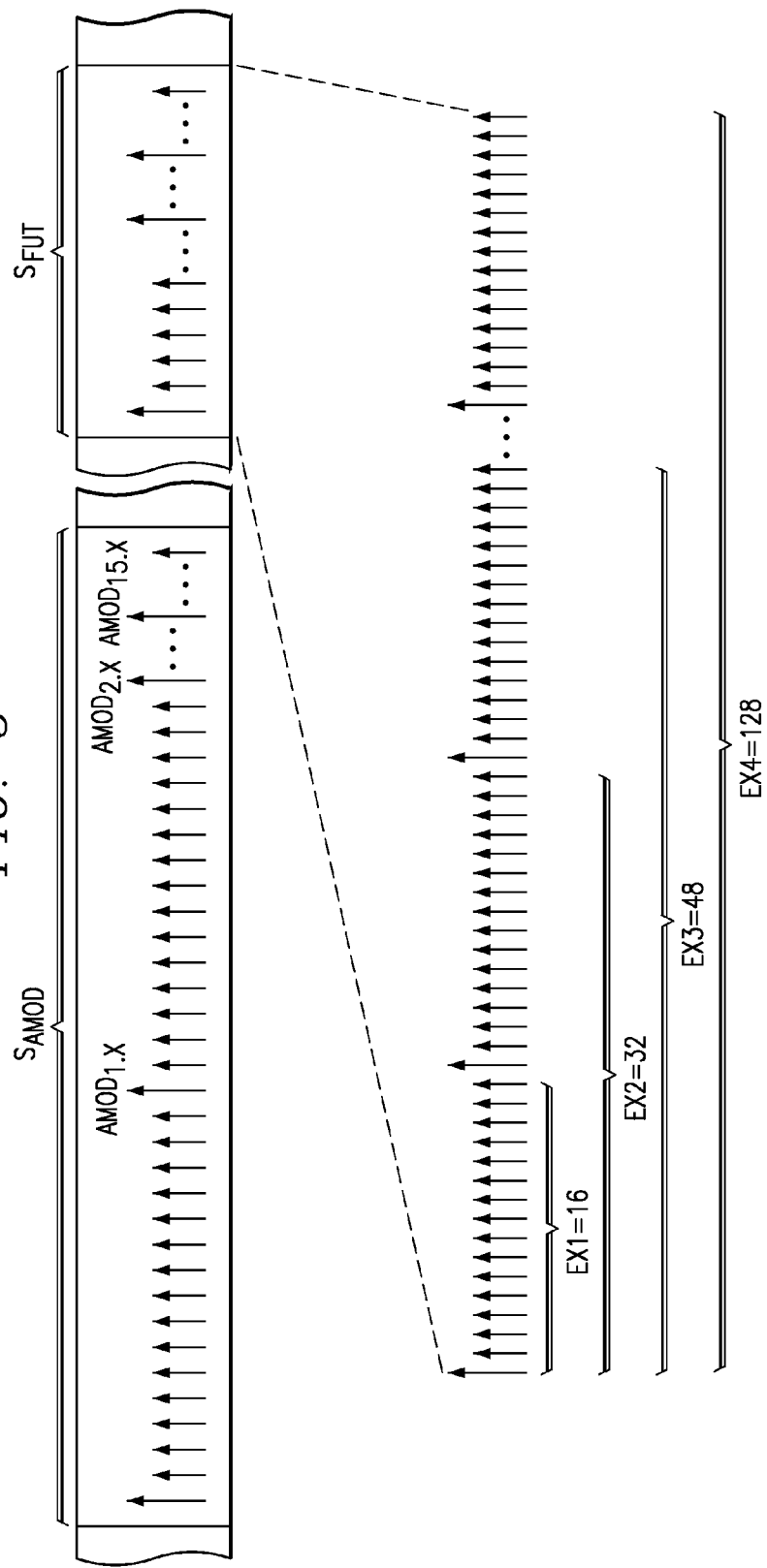
FIG. 5 illustrates, according to the preferred embodiment, an AMOD-carrying OFDM symbol $S_{AMOD}$ and a later-transmitted OFDM symbol $S_{FUT}$ that is modulated as described by the previously-transmitted OFDM symbol $S_{AMOD}$.

FIG. 5 illustrates two OFDM symbols in a sequence, with it understood that various symbols exist between the two illustrated OFDM symbols in the same sequence; however, for the sake of simplification, such additional OFDM symbols are not shown. In the preferred embodiment, the two illustrated OFDM symbols are in different superframes, for reasons more clear later. In any event, looking to FIG. 5, a first OFDM symbol in FIG. 5 is an AMOD-carrying OFDM symbol $S_{AMOD}$ according to the preferred embodiment and again is shown in the frequency domain and without a guard interval like FIGS. 3 and 4. Symbol $S_{AMOD}$ represents the form $SF_{2.x}$ from FIG. 4, with greater elaboration in the illustration of FIG. 5 and the following discussion. Symbol $S_{AMOD}$ includes 256 data points, which may be of three different kinds. A first kind of data point is a user data point, as discussed earlier. A second kind of data point is a so-called zero data point, which represents a sub-carrier that does not carry either user or control information. Both the first and second kinds of data points are shown in FIG. 5 using relatively short vertical arrows. A third kind of data point, shown using taller vertical arrows, is an AMOD-carrying control data point, which as introduced earlier is included in a form $SF_{2.x}$ OFDM symbol. Thus, symbol $S_{AMOD}$ includes control data points that include AMOD information such as in forms $SF_{2.1}$, $SF_{2.2}$, and $SF_{2.3}$ in FIG. 4. To better illustrate an additional aspect of the preferred embodiment, rather than the simplified example of only four control data points as in FIG. 4, FIG. 5 illustrates a more realistic example wherein symbol $S_{AMOD}$ includes 16 evenly-spaced control data points indicated by taller vertical arrows; moreover, all but the first control data point in symbol $S_{AMOD}$ includes AMOD information, so each of the 15 AMOD-carrying control points is shown with a corresponding piece of the AMOD information $AMOD_{1.1}$ through $AMOD_{15.1}$. Further, following each control data point is 15 user data points. Accordingly, symbol $S_{AMOD}$ includes a total of 256 data points. Due to the limited space in FIG. 5, however, only the first 32 data points and the last 16 data points are shown in their entirety, with the remaining of the 256 data points to be understood to also exist in symbol $S_{AMOD}$.

By way of introduction to one of the specific types of communication information that are included in the preferred embodiment AMOD information of symbol $S_{AMOD}$, FIG. 5 further includes a symbol $S_{FUT}$, which includes the "FUT" subscript to suggest that symbol $S_{FUT}$ is transmitted and received at some future time relative to symbol $S_{AMOD}$, that is, in a stream of OFDM symbols over time, $S_{FUT}$ is subsequent to $S_{AMOD}$. Symbol $S_{FUT}$ also includes a total of 256 data points, including 16 evenly-spaced control data points with 15 other data points (either user or zero) following each of the evenly-spaced control data points. For reasons more clear below, the first 128 of the 256 data points of symbol $S_{FUT}$ are shown in expanded fashion as are the last 16 of the data points in symbol $S_{FUT}$.

Returning to symbol $S_{AMOD}$ in FIG. 5, in the preferred embodiment, the entirety of its AMOD information, as represented by $AMOD_{1.1}$ through $AMOD_{15.1}$, is used, either alone or in combination with AMOD information from additional AMOD-carrying symbols as described later, to provide an AMOD message to describe how information is modulated in a future OFDM symbol, such as in symbol $S_{FUT}$. As a result, receiver $RX_1$ receives symbol $S_{AMOD}$ and decodes its AMOD information, and then later uses that information to demodulate the data points in the later-received symbol $S_{FUT}$. Further toward this end, the AMOD information in symbol $S_{AMOD}$ includes a parameter referred to herein as set_size. The parameter set_size is therefore part of the AMOD message and defines a set consisting of a number of data points in a future OFDM symbol (e.g., $S_{FUT}$), where that number of user data points are modulated according to additional parameters set forth in the AMOD information. By way of example, therefore, $S_{AMOD}$ carries AMOD information which includes various types of modulation information described later and also a value of set_size, and set_size defines a number of data points in $S_{FUT}$ which are modulated by the other various AMOD information specified in $S_{AMOD}$. In the preferred embodiment, the number of bits in set_size may be different values, depending on the maximum number of data points anticipated to be defined in a set. For example, in the case of FIG. 5, let the maximum number of maximum number of data points anticipated to be defined in a set be equal to 256 data points, that is, $S_{AMOD}$ may specify up to 256 data points in $S_{FUT}$ to be demodulated according to the AMOD information in $S_{AMOD}$. As a result, set_size will be eight bits. Given a range of eight bits, set_size may be equal to any number up to 256. A first example EX1 is shown in FIG. 5, where set_size=16; in this case then the first 16 data points in $S_{FUT}$ are modulated according to other AMOD information provided by $S_{AMOD}$. A second example EX2 is also shown in FIG. 5, where set_size=32; in this case then the first 32 data points in $S_{FUT}$ are modulated according to other AMOD information provided by $S_{AMOD}$. FIG. 5 further illustrates numerous other examples, where all the examples of FIG. 5 are set forth in the following Table 1:

TABLE 1

| set_size | example |
|---|---|
| 16 | EX1 |
| 32 | EX2 |
| 48 | EX3 |
| 128 | EX4 |

Having demonstrated in FIG. 5 the use of set_size, further elaboration is helpful in connection with the earlier statement that in the preferred embodiment the AMOD message in superframe SPRF includes multiple groups of AMOD information, where each group corresponds to a different set of data points. For example, assume that a first AMOD group G1 in an AMOD message has its parameter set_size equal to 48, as in the case of EX3 in Table 1 and FIG. 5. As a result, therefore, the remaining modulation information in group G1 characterizes the modulation of those 48 data points in $S_{FUT}$. However, given this example, this leaves the latter 80 of the 128 data points of $S_{FUT}$ to be described by different AMOD data. To complete the example, therefore, assume also that the AMOD message from the superframe that include $S_{AMOD}$ includes two other AMOD groups G2 and G3, wherein AMOD group G2 has its parameter set_size equal to 16 and wherein group AMOD G3 has its parameter set_size equal to 64. As a result, after the 48 data points of $S_{FUT}$ shown in FIG. 5 as EX3, the next 16 data points of $S_{FUT}$ are modulated according to the AMOD information in AMOD group G2, while the final 64 data points of $S_{FUT}$ are modulated according to the AMOD information in AMOD group G3.

Two additional observations are also noteworthy with respect to the parameter set_size as further demonstrated through the previous examples and Table 1. First, while the examples of Table 1 illustrate set_size equal to values that are a multiple of 16, other values where this is not the case may be used. Second, FIG. 5 simplifies the illustration of the collection of data points in sets by depicting the sets as collections of data points in the frequency domain starting from left to right, that is, in a linear fashion. However, in the preferred embodiment the actual transmission is not in linear order, but instead the user and control data points are scrambled in a certain fashion, such as through the use of bit reversal or some other technique to spread out the information and, thus, decrease the effect of any communication errors. Bit reversal is known in the art and generally involves taking a binary bit assignment value and reversing the order of those binary bits to change the assignment. For example, if the decimal value 1 is indicated as a seven bit number (i.e., 0000001), then in bit-reversed fashion it indicates a value of decimal 64 (i.e., 1000000). Thus, if a data point corresponds to a linear location of 1, then in bit reversed fashion it instead is mapped to location of 64. In addition, in the preferred embodiment, the AMOD-carrying control data points are in fixed locations, and the zero data points are split equally at the beginning and end of each OFDM symbol. For example, assume that an OFDM symbol includes a total of 128 data points, wherein 90 of those data points are user data points, 16 of those data points are AMOD-carrying control data points, and the remaining 22 of the data points are zero data points. In such a case, each of the 16 AMOD-carrying control data points are at a fixed location, such as every eighth data point, and the 22 zero data points are split equally with 11 zero data points at the beginning of the OFDM symbol (other than in each eighth location which is reserved for an AMOD-carrying control data point) and 11 zero data points at the end of the OFDM symbol. The remaining data points, not occupied by either an AMOD-carrying control data point or a zero data point, are the locations for the user data points. However, with bit reversal, when the data points are mapped to bit-reversed locations, some of the bit reversals may identify a location already occupied by an AMOD-carrying data point (e.g., every eighth location) or a zero data point; preferably, the location of the AMOD-carrying data point and the zero data point is maintained and the bit-reversed location for the data point is instead further re-assigned so that the AMOD-carrying data point or the zero data point can remain in its fixed location. Given this example or any other type of scrambling, as the information is received in bit reversed order, thereafter a bit reversal or other appropriate de-scrambling is performed so that the symbols adjacent to each other in bit-reversed fashion will be returned to their original order. Given this bit reversal formation or other scrambling technique, when set_size defines a number of data points in a set, in the preferred embodiment the set is defined in the bit reversed or scrambled format rather than the more simplified version as shown in FIG. 5. In other words, the data points in each set defined by a corresponding value of set_size may be mapped in various fashions, and this mapping is also taken into account so that set_size identifies the data points in that set and as scrambled across $S_{FUT}$ rather than as the data points would appear in linear fashion.

With the above having demonstrated that in the preferred embodiment each AMOD group defines a set of data points in a future OFDM symbol that is modulated according to corresponding AMOD information, an additional AMOD parameter is now described and is included in each AMOD group. Specifically, each AMOD group also includes an indication of a number assigned to the superframe in which the present AMOD information-carrying OFDM symbol is located, and this number is designated herein as SPRF_no. For example in FIG. 5, the AMOD-carrying symbol $S_{AMOD}$ has a value of SPRF_no. that identifies the superframe in which $S_{AMOD}$ is included. In the preferred embodiment, SPRF_no is a 4 bit number and, thus, may specify a value from 0 to 15; thus, a total of up to 16 different superframe numbers may be specified, and preferably therefore the superframe number increments for each superframe and is a value of modulo 16.

Another aspect of the preferred embodiment is directed to the timing of when AMOD parameters may change, and this aspect is also understood with reference to an additional AMOD parameters specified in each AMOD group as well as the previous discussion of FIG. 5. Particularly, recall from FIG. 5 that the AMOD information in one AMOD-carrying OFDM symbol (e.g., $S_{AMOD}$) defines the modulation parameters for a future OFDM symbol (e.g., $S_{FUT}$). In the preferred embodiment, the location of the future OFDM symbol is in a superframe transmitted and received later than the present AMOD-carrying OFDM symbol. Specifically, recall that superframe SPRF includes a number of OFDM symbols, where in the illustrated example that number equals 180. As a result, a given superframe has a boundary that separates it from an immediately-following successive superframe, and so forth for future-transmitted superframes. Given the grouping of OFDM symbols into such a format, in the preferred embodiment, AMOD information may be changed at any superframe boundary. In other words, because each superframe is a multiple of the interleaving size (e.g., a multiple of 18), then the bit interleaver returns to the same phase at the start of every superframe. Thus, when AMOD information is to be changed, then each AMOD group in an AMOD message in a given superframe indicates a future superframe in which different modulation is used for the data point set corresponding to each group. Particularly, each AMOD group also includes a superframe number for a superframe in the future to which the present AMOD group will apply, and this number is designated herein as fut_SPRF_no. For example, suppose that receiver $RX_1$ is presently processing a superframe having a value of SPRF_no=3 according to AMOD information specified in the present superframe. In the preferred embodiment, such AMOD information is not for application to the present superframe (i.e., SPRF_no=3), but instead such AMOD information is to be applied to a subsequent superframe, such as the next superframe which in the present example would be SPRF_no=4 (or at a later superframe having SPRF_no>4); in this example, therefore, the AMOD information in the present superframe will include a value of fut_SPRF_no=4. Accordingly, when the superframe number 4 is later received (as detected by a method described later), then the AMOD message from SPRF_no=3 is the proper modulation information for deciphering the data points in superframe SPRF_no=4. Thus, modulation as well as the characterization of that modulation by the AMOD information may change as between different superframes. Moreover, recall that each superframe SPRF is preferably an integer multiple of the bit interleaving size of interleaver 14 (e.g., 18). As a result, changes in the AMOD do not require any re-synchronization of the forward error correction, and similarly therefore there is no need to discontinue downstream communications in order to change AMOD values as is required with respect to CPS in the prior art.

According to the preferred embodiment, each AMOD group also includes an indication of the version of the broadband wireless internet forum ("BWIF"), and this indication is designated herein as BWIF_type. Specifically, BWIF is presently a program of the IEEE Industry and Standards and Technology Organization that is directed toward solutions involving OFDM systems. Presently, the BWIF has provided a version 1.0 set of specifications, and later versions are reasonably to be anticipated. Accordingly, because the preferred embodiment permits the communication of considerably more control information as compared to the prior art, then the preferred embodiment is also more easily adaptable to newer BWIF versions as specified by BWIF_type, or alternatively the preferred embodiments are therefore in effect programmable so that some data points can be modulated and detected according to one BWIF specification and in response to a first value of BWIF_type, while others data points can be modulated and detected according to a different BWIF specification in response to a different value of BWIF_type. In another approach, BWIF_type specifies the BWIF standard version compatibility of the headend or the WATS to which the WM is connected. Indeed, note further that the coding parameters, discussed below, can have different meanings based on the correspondingly-specified BWIF_type.

Each AMOD group in the preferred embodiment also carries, as introduced earlier, CPS information, where CPS information is known in the art. However, the preceding has shown that this CPS information, as part of an AMOD group, can be different in one group versus another group or groups, whereas the prior art uses the same CPS across numerous successive OFDM symbols and the data points therein. In any event, with respect to each AMOD group, the CPS information includes generally four different parameters: (i) modulation type; (ii) coding rate; (iii) number of RS parity bits; and (iv) interleaver depth. Note that items (ii) through (iv) are sometimes referred to in the art as forward error correction ("FEC") parameters. Looking to each of the four CPS parameters, modulation type relates to the type of symbol mapping implemented by modulator 16, and may be specified using two bits. In the preferred embodiment, presently included would be an indication of from a set of 4, 16, 64, and 256 QAM, but as mentioned earlier, other symbol mapping modulation may be used and, hence, the modulation type included in the AMOD information may accommodate these alternatives as well. Coding rate is an indication of the specific rate of the convolutional encoder in the channel encoder block 12, and is presently chosen from one of $\frac{1}{2}, \frac{2}{3}, \frac{3}{4}, \frac{5}{6}$, and $\frac{7}{8}$, and may be specified using three bits. Number of RS parity bits describes the number of parity bytes added by the RS encoder in the channel encoder block 12 and is presently chosen to be either 20 or 22 bytes, and with only two choices may be specified using one bit. Finally, the interleaver depth specifies the number of branches or the depth of the convolutional interleaver, the actual number is chosen from a fixed set depending on the FFT length.

Finally, the present inventors further contemplate that the scope of parameters included in the AMOD information certainly may be expanded, particularly given the great deal of additional control data points that are able to carry different AMOD information under the preferred embodiment. As another example, each AMOD group may be used to specify a different type of coding (e.g., turbo coding). Indeed, with other types of coding, the AMOD information also may specify parameters for that coding type. Other examples may be ascertained by one skilled in the art. Another type of information preferably included in each AMOD group is a cyclic redundancy check ("CRC") indication, as may be specified using eight bits. The CRC is used to check if the AMOD parameters have been received without errors.

Another aspect of the preferred embodiment is directed to detecting the boundary between each received superframe. Such synchronization may be required for various reasons, and has particular application in connection with the earlier discussion of fut_SPRF_no in the AMOD information of a present superframe in order to specify AMOD information for applying to a future-received superframe. In other words, in order to apply AMOD information to a future-received superframe, there is necessarily a need to indentify the boundary of when that future-received superframe is received. This aspect is now described with reference to FIGS. 6 and 7, as detailed below.

Figure 6:
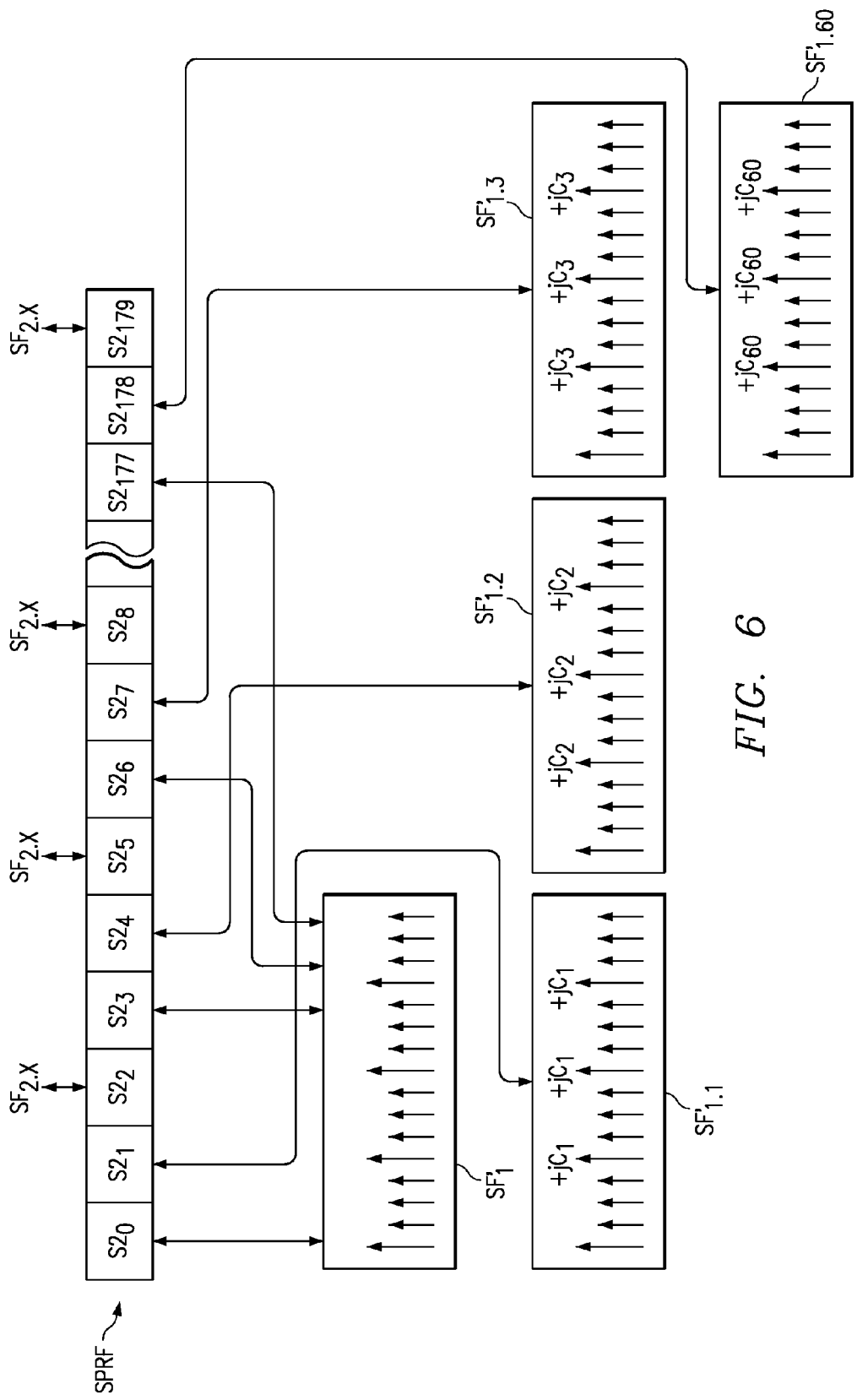
FIG. 6 again illustrates the N+1 sequential OFDM symbols of the superframe from FIG. 4, but in this illustration the emphasis is on every second OFDM symbol in each group of three OFDM symbols in the superframe.

FIG. 6 again illustrates the N+1 sequential OFDM symbols of superframe SPRF from FIG. 4 and as may be presented in response to the formatting of formatter 11 in FIG. 2, but the FIG. 6 illustration emphasizes every second OFDM symbol in each group of three OFDM symbols in superframe SPRF. Specifically, recall in connection with FIG. 4 that it is stated that for every group of three OFDM symbols, the first two OFDM symbols take a form $SF_1'$ which include user and evenly-spaced control data points, where the control data points do not include CPS information. As illustrated in FIG. 6, however, the form of each second OFDM symbol of these groups of OFDM symbols does differ from the first OFDM symbol, not in the manner of CPS information, but in the manner of a synchronization code. Thus, each second OFDM symbol of these groups of OFDM symbols is shown to have a different form $SF_{1,z}'$, where the difference in each such form as demonstrated by a change in z is as detailed below.

In the preferred embodiment, in each group of three OFDM symbols, the control points in each second OFDM symbol (other than the first control point in each such OFDM symbol) includes a different portion of a 60-digit synchronization code. For illustration, let the code be designated as shown in the following Equation 11:

synchronization code = $\{C_1, C_2, C_3, \ldots, C_{60}\}$    Equation 11

Given Equation 11, each different code digit $C_y$ is carried by a respective second OFDM symbol in a group of three OFDM symbols. For example, digit $C_1$ is carried by OFDM symbol $S2_1$, which is the second OFDM symbol in the first group of three OFDM symbols and which therefore is shown to have the form $SF_{1,1}'$. As another example, digit $C_2$ is carried by OFDM symbol $S2_4$, which is the second OFDM symbol in the second group of three OFDM symbols and which therefore is shown to have the form $SF_{1,2}'$. As another example, digit $C_3$ is carried by OFDM symbol $S2_7$, which is the second OFDM symbol in the third group of three OFDM symbols and which therefore is shown to have the form $SF_{1,3}'$. As a final example, digit $C_{60}$ is carried by OFDM symbol $S2_{178}$, which is the second OFDM symbol in the sixtieth group of three OFDM symbols and which therefore is shown to have the form $SF_{1,60}'$. In addition, in the preferred embodiment each code digit $C_y$ is added as an additional phase component to the control data points of the corresponding OFDM symbol, as shown in FIG. 6 with an indication of $+jC_y$. As a result, by adding this code term to the terms of Equation 2, then for the second OFDM symbol in the $R^{th}$ group of three OFDM symbols, each control data point in that OFDM symbol is the same, and may be represented as in the following Equation 12:

$$e^{j(\phi_X + h\phi_X + C_R)} \qquad \text{Equation 12}$$

The effect of the result in Equation 12 is further understood with reference to the preferred synchronization to a received superframe, as is described immediately below.

Figure 7:
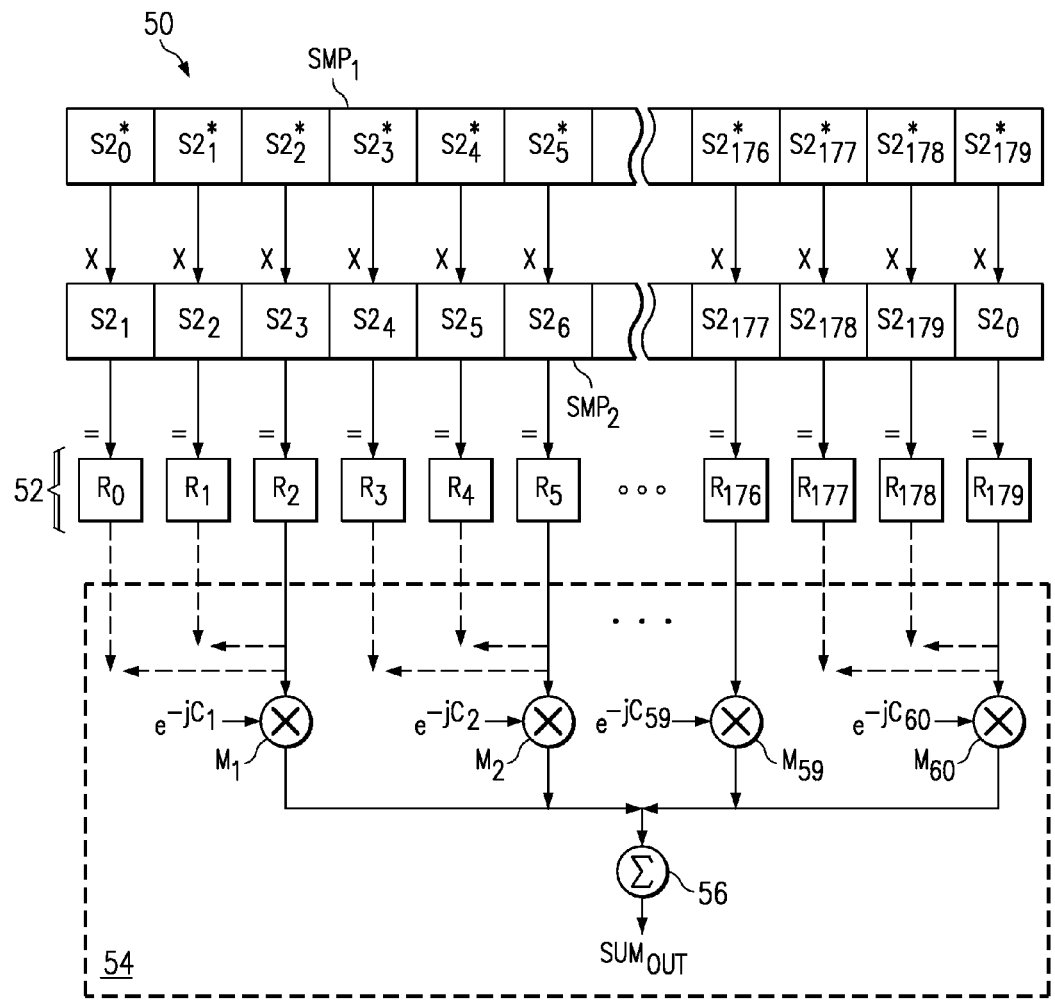
FIG. 7 illustrates a functional block diagram of a synchronization circuit according to the preferred embodiment.

FIG. 7 illustrates a functional block diagram of a synchronization circuit 50 of the preferred embodiment and as implemented as part of synchronization block 34 in FIG. 2. Looking to FIG. 7, synchronization circuit 50 includes a first sample set $SMP_1$ representing the control data points for a number of OFDM symbols equal to the length of the preferred superframe, other than the first control data point of each such OFDM symbol. For consistency with the previous example, therefore, the length of first sample $SMP_1$ equals 180 to match the length of superframe SPRF of FIG. 4. Synchronization circuit 50 further includes a second sample set $SMP_2$, where $SMP_2$ is the same length as $SMP_1$ and represents the complex conjugates of the respective control data points in the OFDM symbols that immediately-precede the OFDM symbols in first sample set $SMP_1$. In other words, the complex conjugates in sample set $SMP_2$ are, in effect, the control data points from a one OFDM symbol time shift backward with respect to the respective control data points of the set of 180 OFDM symbols in sample set $SMP_1$. Synchronization circuit 50 further includes a product store 52, which by the illustration of FIG. 7 is intended to depict the results of a multiplication of each value in sample set $SMP_1$ with the respective value in sample set $SMP_2$. For example, product store 52 stores a result, $R_0$, as the product of $S2_1$ with $S2_0^*$, product store 52 stores a result, $R_1$, as the product of $S2_2$ with $S2_1^*$, and so forth up through result $R_{179}$, which is the product of $S2_0$ (from the next superframe) with $S2_{179}^*$. The output of every third result is coupled to a correlator 54, and more particularly as a first multiplicand to a respective multiplier within correlator 54, where each such multiplier receives as a second multiplicand an exponential with a negative value of a different one of the 60 code digits from Equation 11. For example, result $R_2$ is connected as a multiplicand to a multiplier $M_1$ that receives the value $e^{-jC_1}$ as a second multiplicand, result $R_5$ is connected as a multiplicand to a multiplier $M_2$ that receives the value $e^{-jC_2}$ as a second multiplicand, and so forth through result $R_{179}$, which is connected as a multiplicand to a multiplier $M_{60}$ that receives the value $e^{-jC_{60}}$ as a second multiplicand. Finally, the outputs of all multipliers $M_1$ through $M_{60}$ are connected to a summer 56, which provides an output signal $SUM_{OUT}$.

The operation of synchronization circuit 50 according to the preferred embodiment is now described. First, from the connections described above, one skilled in the art will appreciate that the multiplication of sample set $SMP_1$ with sample set $SMP_2$ provides results $R_0$ through $R_{179}$ relating to the control data points in a first stream of 180 OFDM symbols as multiplied times the complex conjugates of the respective control data points in a second stream of 180 OFDM symbols, where the first and second streams are shifted in time relative to one another by one OFDM symbol. Thus, in this sense alone, this multiplication operates with respect to a group of 180 OFDM symbols in the same manner as described in the prior art to identify the location of CPS information; however, in the preferred embodiment, the result instead bears on the synchronization of superframe SPRF as a whole, as is now explored in greater detail. Once results $R_0$ through $R_{179}$ are obtained, correlator 54 determines a correlation of the 60 digit code from Equation 11 with respect to those results, where this determination is achieved by multiplying every third location in the result times a corresponding one of the digits from the 60 digit code and summing the result to output $SUM_{OUT}$. For sake of reference, let this first correlation sum, taken with respect to the 60 results $R_2, R_5, \ldots R_{179}$, be represented as $SUM_{OUT1}$. Next, as shown by dashed arrows with respect to the inputs of each multiplier $M_1$ through $M_{60}$ and the 60 results $R_1, R_4, \ldots R_{178}$, correlator 54 shifts to the left by one result location and the operation is repeated so that a second correlation sum is taken with respect to those 60 results $R_1, R_4, \ldots R_{178}$, and let this sum be represented as $SUM_{OUT2}$. Finally, as also shown by dashed arrows with respect to the inputs of each multiplier $M_1$ through $M_{60}$ and the 60 results $R_0, R_3, \ldots R_{177}$, correlator 54 shifts to the left by one result location and the operation is repeated so that a third correlation sum is taken with respect to the 60 results $R_0, R_3, \ldots R_{177}$, and let this sum be represented as $SUM_{OUT3}$. The sum values $SUM_{OUT1}$, $SUM_{OUT2}$, and $SUM_{OUT3}$ are then stored, for use as further described below After sum values $SUM_{OUT1}$, $SUM_{OUT2}$, and $SUM_{OUT3}$ are determined and stored, sample sets $SMP_1$ and $SMP_2$ are also shifted by three OFDM symbols and the above process is repeated in comparable fashion to determine sum values $SUM_{OUT4}$, $SUM_{OUT5}$, and $SUM_{OUT6}$ in the same manner as above, that is, by correlator 54 first operating in the position shown in FIG. 7 to obtain $SUM_{OUT4}$, and then shifting once to the left for each respective determination of $SUM_{OUT5}$ and $SUM_{OUT6}$. The above-described process continues, wherein one skilled in the art will therefore appreciate that for each shift of three symbols for sample sets $SMP_1$ and $SMP_2$, there is then three sum determinations by correlator 54 at the three different above-described shifting positions i with respect to results $R_i, R_{i+3}, \ldots R_{177+i}$. Given the above, one skilled in the art will appreciate that once the sample sets $SMP_1$ and $SMP_2$ have shifted a total of 60 times (i.e., at three symbols for each shift and thereby corresponding to the 180 OFDM symbols in a superframe), correlator 54 has determined a total of 180 (i.e., $3*60=180$) values for $SUM_{OUT}$, and in doing so it has effectively performed a sliding window correlation of the Equation 11 code with the control data points of the incoming OFDM symbols. Accordingly, since all 180 different possibilities have been evaluated for the 180 OFDM symbols in the superframe, and assuming a good autocorrelation property of the Equation 11 code, then for reasons detailed below one noticeable maximum should occur across the 180 values for $SUM_{OUT}$. This maximum, therefore, indicates an alignment of the values in sample set $SMP_1$ with the Equation 11 code, that is, when the values as stored in sample set $SMP_1$ give rise to the maximum peak, it is then known that sample set $SMP_1$ at the time corresponding to the location when it provided the maximum stored the superframe in its entirety from beginning to end (as opposed to one portion of one superframe and another portion of a previous or subsequent superframe). In other words, at that point, proper synchronization of the entire superframe is detected. Naturally, therefore, this detection provides the boundaries of the beginning and end of the superframe.

To further appreciate the result of synchronization circuit 50, note that it achieves, in the preferred embodiment, a complex conjugate multiplication between immediately-successive OFDM symbols as described earlier with respect to the prior art location of CPS, but here this multiplication relates instead to the inventive OFDM and superframe format. Specifically, recall that the prior art multiplication sought to locate two successive OFDM symbols of the form $SF_1$. However, as explained above with reference to Equation 12, unlike the prior art, the preferred embodiment does not use the same data on the control data points for each two of the first three OFDM symbols in a sequence, but rather, it adds a different code digit to the control points of each second OFDM symbol in a group of three OFDM symbols. Looking in greater detail at this distinction, Equation 3 depicts the four control data points as appear in each first OFDM symbol in a group of three OFDM symbols according to the preferred embodiment, which is the same as shown in the form $SF_1$ of the prior art. However, in contrast, Equation 12 may be expanded to demonstrate the three latter control data points (i.e., ignoring the first control data point since it does not carry control information) in the second OFDM symbol in a group of three according to the preferred embodiment (e.g., form $SF_{1.1}'$), which have an added synchronization code digit $C_1$, as is shown in the following Equation 13:

$$e^{j(\phi_2 + h\phi_2 + C_1)}, e^{j(\phi_3 + h\phi_3 + C_1)}, e^{j(\phi_4 + h\phi_4 + C_1)} \qquad \text{Equation 13}$$

Again ignoring the first control data point in the OFDM symbols, then from Equations 13 and 3, it may be appreciated that when synchronization circuit 50 operates to multiply each data point in one of these Equations times the complex conjugate of the corresponding data point in the other Equation, then the result is as shown in the following Equation 14:

$$e^{j(C_1)}, e^{j(C_1)}, e^{j(C_1)} \qquad \text{Equation 14}$$

In other words, Equation 14 demonstrates that by including the code digit in the control data points of each second OFDM symbol in a group of three OFDM symbols as shown in Equation 12, then the complex conjugate operation when that second OFDM symbol is multiplied times the first OFDM symbol in the group provides just the value of the code digit $C_1$. Naturally, this same principle applies to each first and second OFDM symbol in a group of three OFDM symbols, that is, as between a form $SF_1'$ and a form $SF_{1.R}'$ OFDM symbol. Moreover, the complex conjugate operation across all 60 groups of three OFDM symbols therefore provides the entire synchronization code of Equation 11. Further, when the complex conjugate operation is performed with respect to other OFDM symbols, such as between the second and third OFDM symbol in a group (i.e., forms $SF_{1.R}'$ and $SF_{2.x}$, respectively) or between the third OFDM symbol in one group and the immediately-following first OFDM symbol in the next group (i.e., forms $SF_{2.x}$ and $SF_1'$ respectively), then the result will include a considerable phase component and therefore is readily distinguishable from the result that occurs as shown by way of example in the preceding Equation 14.

Given the above, one skilled in the art will appreciate that in the 180 values in product store 52, every third value therein will store a digit of the 60 digit code, but there are two unknowns. First, it is unknown whether these digits will be in the proper order from the first to last of the 60 digits, and second it is unknown what is the offset, if any, from result $R_0$ in which case the 60 digits are stored. With respect to the latter, if the offset is one, then one of each of the 60 different codes, in unknown order, will appear in results $R_1$, $R_4$, ..., $R_{178}$, and for an offset of two, then one of each of the 60 different codes, in unknown order, will appear in results $R_2$, $R_5$, ..., $R_{179}$, or an offset of zero, then one of each of the 60 different codes, in unknown order, will appear in $R_0$, $R_2$, ..., $R_{177}$. The further operation of correlator 54 can determine both the offset and find the instance of when superframe SPRF is properly aligned in sample set $SMP_2$. Particularly, when the 60 digits of the code are in sequential order within product store 52, then digit $C_1$ will be in one of results $R_0$ through $R_2$, digit $C_2$ will be in one of results $R_3$ through $R_5$, and so forth. Accordingly, when correlator 54 determines its first value of $SUM_{OUT}$ at an offset of two (i.e., for results $R_1$, $R_4$, ..., $R_{178}$), if the 60 digits are aligned in those locations then note that the first code $e^{jC_1}$, as stored in result $R_2$, will be multiplied times its complex conjugate of $e^{-jC_1}$; as a result, the phase terms will cancel leaving only an amplitude result. In contrast, if there is no alignment, then the result of the multiplication will include a non-negligible phase amount, thereby producing a lesser value for the output of multiplier $M_1$. This same effect occurs across all of multipliers $M_1$ through $M_{60}$ and, hence, is also reflected in the sum of the outputs of those multipliers, that is, in $SUM_{OUT}$. Accordingly, once the 60 digits of the code are located in order and in product store 52, the value of $SUM_{OUT}$ is a maximum. Recalling from above that synchronization circuit 50 stores all 180 different possible values of $SUM_{OUT}$, then the one providing a maximum will correspond to the time when a superframe was properly aligned (i.e., synchronized) within sample set $SMP_2$.

Further in connection with synchronization circuit 50, recall the above function assumes that the 60 digit code of Equation 11 provides an acceptable autocorrelation property. Toward this end, in the preferred embodiment the 60 digit code is derived from a length 64 constant amplitude zero auto-correlation ("CAZAC") sequence, where CAZAC codes in their full-length entirety are known in the correlation art However, given the preferred embodiment need for a 60 digit code as opposed to the 64 digits provided in the known CAZAC codes, it was endeavored in connection with the preferred embodiments to evaluate what modification to a 64 digit code provided an optimal superframe synchronization. Toward this end, it was determined that the optimal correlation was achieved by eliminating the last 4 digits from a known 64 digit CAZAC code, as opposed to some other alteration as many were considered such as removing single or multiple digits at different locations within the 64 different digits of the code. Accordingly, in the preferred embodiment, a respective one of each of the 60 digits is modulated on the control data points in each respective form SF$_{1,x}$' symbol of FIG. 6 and in the sequence shown in the following Table 2, where each value is an integer multiplied times a value $$\frac{\pi}{4}.$$

TABLE 2

| Sequence | Digit |
|---|---|
| 1 | 0 |
| 2 | 1 |
| 3 | 2 |
| 4 | 3 |
| 5 | 4 |
| 6 | 5 |
| 7 | 6 |
| 8 | 7 |
| 9 | 0 |
| 10 | 2 |
| 11 | 4 |
| 12 | 6 |
| 13 | 0 |
| 14 | 1 |
| 15 | 3 |
| 16 | 6 |
| 17 | 0 |
| 18 | 3 |
| 19 | 6 |
| 20 | 0 |
| 21 | 3 |
| 22 | 7 |
| 23 | 1 |
| 24 | 5 |
| 25 | 0 |
| 26 | 4 |
| 27 | 0 |
| 28 | 3 |
| 29 | 0 |
| 30 | 3 |
| 31 | 0 |
| 32 | 3 |
| 33 | 0 |
| 34 | 5 |
| 35 | 1 |
| 36 | 7 |
| 37 | 3 |
| 38 | 1 |
| 39 | 6 |
| 40 | 2 |
| 41 | 0 |
| 42 | 6 |
| 43 | 3 |
| 44 | 1 |
| 45 | 0 |
| 46 | 6 |
| 47 | 3 |
| 48 | 2 |
| 49 | 0 |
| 50 | 7 |
| 51 | 6 |
| 52 | 5 |
| 53 | 3 |
| 54 | 2 |
| 55 | 2 |
| 56 | 0 |
| 57 | 0 |
| 58 | 0 |
| 59 | 0 |
| 60 | 0 |

For example, for the first digit in Table 2 of 0, the control data points in form SF$_{1,1}$' include a phase shift of $$0 * \frac{\pi}{4} = 0,$$

while for the second digit in Table 2 of 0, the control data points in form SF$_{1,2}$' include a phase shift of $$1 * \frac{\pi}{4} = \frac{\pi}{4},$$

and for the sixtieth digit in Table 2 which is also 0, the control data points in form SF$_{1,60}$' also include a phase shift of $$0 * \frac{\pi}{4} = 0.$$

One skilled in the art may readily ascertain the remaining phase shifts from Table 2

From the above, it may be appreciated that the above embodiments provide an OFDM wireless communication system wherein differing sets of data points are defined within a single OFDM symbol, where each set may be modulated by a different group of modulation parameters. As a result, different receivers (e.g., WMs) can receive signals in the same bandwidth and from the same WATS, but due to the differing control parameters, greater overall signal performance can be achieved as to all receivers by customizing the parameters per receiver or sets of receivers. For example, different receivers can receive different constellation densities and/or FEC parameters in the downstream direction, as specified to the receivers in the AMOD information. To further implement these benefits, for example, at start-up, each WM may determine which constellation and FEC parameters it may accommodate and establish this information in its user profile. Thereafter, the WATS may dynamically read this information and adapt the AMOD information into groups to correspond to the different parameters specified in the user profiles of the different WMs. In response, the WATS adapts the modulation and/or FEC parameters to optimize cells dynamically by using different downstream AMOD for different groups of WMs, thereby increasing cell capacity. Further, the preferred embodiment has been shown to have different variations, where one skilled in the art will appreciate still others. Consequently, while the present embodiments have been described in detail, various substitutions, modifications or alterations could be made to the descriptions set forth above without departing from the inventive scope which is defined by the following claims.

The invention claimed is:

1. A wireless transmitter, comprising:
   circuitry for providing a plurality of control bits;
   circuitry for providing a plurality of user bits;
   circuitry for modulating the plurality of control bits and the plurality of user bits into a stream of complex symbols;
   circuitry for converting the stream of complex symbols into a parallel plurality of complex symbol streams;

circuitry for performing an inverse fast Fourier transform on the parallel plurality of complex symbol streams to form a parallel plurality of OFDM symbols;

circuitry for converting the parallel plurality of OFDM symbols into a serial stream of an integer N+1 OFDM symbols, wherein N+1 is a multiple of three;

wherein each OFDM symbol in the serial stream of OFDM symbols comprises a plurality of data points;

wherein selected OFDM symbols in the serial stream of OFDM symbols carry modulation information and the selected OFDM symbols are each a third OFDM symbol in a sequence of three OFDM symbols in the serial stream and wherein each second OFDM symbol in the sequence of three OFDM symbols in the serial stream comprises control data points carrying a portion of a synchronization code;

wherein the modulation information in one or more of the selected OFDM symbols comprises a plurality of modulation groups;

wherein each of the plurality of modulation groups comprises a number of modulation parameters that describe modulation of a corresponding set of data points in a subsequent OFDM symbol in the serial stream of OFDM symbols.

2. The wireless transmitter of claim 1:

wherein the plurality of data points comprise control data points; and wherein the modulation information is represented as an exponential phase shift on selected control data points in the selected OFDM symbols.

3. The wireless transmitter of claim 1:

wherein the serial stream comprises an integer N+1 OFDM symbols;

wherein N+1 is a multiple of three; and wherein the selected OFDM symbols are each a third OFDM symbol in a sequence of three OFDM symbols in the serial stream.

4. The wireless transmitter of claim 3 wherein the modulation information is repeated a number of times within the selected OFDM symbols in the integer N+1 OFDM symbols.

5. The wireless transmitter of claim 1 wherein the modulation parameters comprise an identifier of a number of data points in the set of data points corresponding to the modulation group.

6. The wireless transmitter of claim 1:

wherein the modulation parameters comprise an identifier of a superframe;

wherein the superframe includes the selected OFDM symbol that includes the identifier; and wherein the superframe comprises an integer N+1 OFDM symbols.

7. The wireless transmitter of claim 1 wherein the modulation parameters comprise an identifier of the subsequent OFDM symbol.

8. The wireless transmitter of claim 1 wherein the modulation parameters comprise an identifier of a version of the broadband wireless internet forum corresponding to the modulation parameters.

9. The wireless transmitter of claim 1 wherein the modulation parameters comprise an identifier of a modulation type used for the corresponding set of data points.

10. The wireless transmitter of claim 1 wherein the modulation parameters comprise an identifier of a coding rate used for the corresponding set of data points.

11. The wireless transmitter of claim 1 wherein the modulation parameters comprise an identifier of a number of RS parity bits used for the corresponding set of data points.

12. The wireless transmitter of claim 1 and further comprising an interleaver for interleaving the plurality of control bits and the plurality of user bits, wherein the modulation parameters comprise an identifier of the interleaver depth used for the corresponding set of data points.

13. The wireless transmitter of claim 1 wherein the modulation parameters comprise an identifier of a cyclic redundancy check used for determining whether the modulation parameters are received without errors.

14. The wireless transmitter of claim 1 wherein the modulation parameters comprise an identifier of a coding type used for the corresponding set of data points.

15. The wireless transmitter of claim 1 wherein each portion of a synchronization code is represented as an exponential phase shift on selected control data points in the second OFDM symbol in each sequence of three OFDM symbols in the serial stream.

16. The wireless transmitter of claim 15:

wherein N+1=180; and wherein the synchronization code consists of 60 digits.

17. The wireless transmitter of claim 16 wherein the synchronization code comprises a portion of a 64-bit constant amplitude zero auto-correlation sequence.

18. The wireless transmitter of claim 1 and further comprising an interleaver for interleaving the plurality of control bits and the plurality of user bits according to a bit interleaving size; and wherein the serial stream comprises an integer N+1 OFDM symbols; and wherein N+1 is a multiple of the bit interleaving size.

19. A wireless receiver, comprising:

at least one antenna for receiving a wireless signal, the signal comprising a serial stream comrrisina an integer N+1 of OFDM symbols, wherein each OFDM symbol in the serial stream of integer N+1 OFDM symbols comprises a plurality of control data points, wherein N+1 is a multiple of three; and circuitry for recovering modulation information from selected OFDM symbols in the serial stream of OFDM symbols, wherein the selected OFDM symbols are each a third OFDM symbol in a sequence of three OFDM symbols in the serial stream and wherein each second OFDM symbol in the sequence of three OFDM symbols in the serial stream comprises control data points carrying a portion of a synchronization code;

wherein the modulation information in one or more of the selected OFDM symbols comprises a plurality of modulation groups; and wherein each of the plurality of modulation groups comprises a number of modulation parameters that describe modulation of a corresponding set of data points in a subsequent OFDM symbol in the serial stream of OFDM symbols.

20. The wireless receiver of claim 19 and further comprising circuitry for demodulating signals responsive to the OFDM symbols in response to the modulation information.

21. The wireless receiver of claim 19 and further comprising:

circuitry for converting the serial stream of OFDM symbols into a plurality of parallel streams of OFDM symbols; and circuitry for performing a fast Fourier transform on the plurality of parallel streams of OFDM symbols to form a parallel plurality of complex symbols.

22. The wireless receiver of claim 21 and further comprising:
circuitry for converting the parallel plurality of complex symbols into a serial stream of complex symbols;
circuitry for demodulating the serial stream of complex symbols in response to the modulation information.

23. The wireless receiver of claim 19 wherein the modulation parameters comprise an identifier of the subsequent OFDM symbol.

24. The wireless receiver of claim 19 wherein the modulation parameters comprise an identifier of a version of the broadband wireless internet forum corresponding to the modulation parameters.

25. The wireless receiver of claim 19 wherein the modulation parameters comprise an identifier of a modulation type used for the corresponding set of data points.

26. The wireless receiver of claim 19 wherein the modulation parameters comprise an identifier of a coding rate used for the corresponding set of data points.

27. The wireless receiver of claim 19 wherein the modulation parameters comprise an identifier of a number of RS parity bytes used for the corresponding set of data points.

28. The wireless receiver of claim 19, wherein the modulation parameters comprise an identifier of an interleaver depth used by a transmitter of the corresponding set of data points.

29. The wireless receiver of claim 19 wherein the modulation parameters comprise an identifier of a cyclic redundancy check used for determining whether the modulation parameters are received without errors.

30. The wireless receiver of claim 19 wherein the modulation parameters comprise an identifier of a coding type used for the corresponding set of data points.

31. The wireless receiver of claim 19 wherein each portion of a synchronization code is represented as an exponential phase shift on selected control data points in the second OFDM symbol in each sequence of three OFDM symbols in the serial stream.

32. The wireless receiver of claim 31:
wherein N+1=180; and
wherein the synchronization code consists of 60 digits.

33. The wireless receiver of claim 32 wherein the synchronization code comprises a portion of a 64-bit constant amplitude zero auto-correlation sequence.

* * * * *